United States Patent
Nagai et al.

(10) Patent No.: US 10,761,065 B2
(45) Date of Patent: Sep. 1, 2020

(54) DEVICE FOR INSPECTING JUNCTION-TYPE OUTER JOINT MEMBER OF CONSTANT VELOCITY UNIVERSAL JOINT

(71) Applicant: NTN CORPORATION, Osaka (JP)

(72) Inventors: Hiromi Nagai, Shizuoka (JP); Daisuke Kagawa, Shizuoka (JP); Naoki Nakagawa, Shizuoka (JP); Takashi Imanaka, Shizuoka (JP); Yasuhiko Sakakibara, Shizuoka (JP); Tokio Ueda, Shizuoka (JP); Masazumi Kobayashi, Shizuoka (JP); Tatsuro Sugiyama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 96 days.

(21) Appl. No.: 15/502,872

(22) PCT Filed: Jul. 23, 2015

(86) PCT No.: PCT/JP2015/070922
§ 371 (c)(1),
(2) Date: Feb. 9, 2017

(87) PCT Pub. No.: WO2016/024468
PCT Pub. Date: Feb. 18, 2016

(65) Prior Publication Data
US 2017/0234836 A1 Aug. 17, 2017

(30) Foreign Application Priority Data
Aug. 12, 2014 (JP) .................................. 2014-164108

(51) Int. Cl.
*G01N 29/04* (2006.01)
*B23K 31/12* (2006.01)
(Continued)

(52) U.S. Cl.
CPC ......... *G01N 29/043* (2013.01); *B23K 31/125* (2013.01); *F16D 1/027* (2013.01);
(Continued)

(58) Field of Classification Search
CPC .. F16D 2250/0076; F16D 1/068; F16D 1/027; G01N 2291/267–2677;
(Continued)

(56) References Cited

U.S. PATENT DOCUMENTS 3,552,191 A * 1/1971 Heseding ............. G01N 29/043
73/624
4,144,494 A 3/1979 Pawelletz et al.
(Continued)

FOREIGN PATENT DOCUMENTS

EP 1542004 A1 * 6/2005 ........... G01N 29/225
JP 53-35594 4/1978
(Continued)

OTHER PUBLICATIONS

Mitutoyo, Quick Guide to Precision Measuring Instruments (Year: 2012).*
(Continued)

*Primary Examiner* — David L Singer
(74) *Attorney, Agent, or Firm* — Wenderoth, Lind & Ponack, L.L.P.

(57) ABSTRACT

An inspection device inspects a joint-type outer joint member of a constant velocity universal joint that includes a cup section having a bottomed cylindrical shape and track grooves in an inner periphery thereof for torque transmitting elements, and a shaft section extending from a bottom of the cup section. The inspection device inspects the outer joint member, which is obtained through melt-welding on a cup member forming the cup section and a shaft member forming the shaft section. The inspection device includes a
(Continued)

surface inspection unit to inspect for a defect which appears on a surface of the outer joint member due to welding, an internal inspection unit to inspect for an internal defect of a welded portion, and a recording unit to record an inspection result of the inspection. The inspection device is configured to efficiently perform in-line total inspection for the melt-welded joint-type outer joint member.

4 Claims, 28 Drawing Sheets

(51) Int. Cl.
| | |
|---|---|
| F16D 1/027 | (2006.01) |
| G05B 19/418 | (2006.01) |
| G01N 29/275 | (2006.01) |
| G01N 29/28 | (2006.01) |
| G01N 29/48 | (2006.01) |
| F16D 3/20 | (2006.01) |
| G01N 21/95 | (2006.01) |
| B21K 1/76 | (2006.01) |
| B23K 26/21 | (2014.01) |
| B23K 15/00 | (2006.01) |
| G01N 29/44 | (2006.01) |
| F16D 3/223 | (2011.01) |
| F16D 3/227 | (2006.01) |
| F16D 3/205 | (2006.01) |

(52) U.S. Cl.
CPC .............. *F16D 3/20* (2013.01); *G01N 21/95* (2013.01); *G01N 29/041* (2013.01); *G01N 29/275* (2013.01); *G01N 29/28* (2013.01); *G01N 29/48* (2013.01); *G05B 19/4183* (2013.01); *B21K 1/765* (2013.01); *B23K 15/0053* (2013.01); *B23K 26/21* (2015.10); *F16D 3/2055* (2013.01); *F16D 3/227* (2013.01); *F16D 2003/22326* (2013.01); *F16D 2250/0076* (2013.01); *G01N 29/4445* (2013.01); *G01N 2201/06113* (2013.01); *G01N 2291/0234* (2013.01); *G01N 2291/0289* (2013.01); *G01N 2291/044* (2013.01); *G01N 2291/2626* (2013.01); *G01N 2291/2634* (2013.01); *G01N 2291/2675* (2013.01)

(58) Field of Classification Search
CPC ... G01N 2291/2634; G01N 2291/0234; G01N 29/275; G01N 29/225; G01N 29/4445; G01N 29/28; G01N 29/043; G01N 29/221; G01N 2291/044; G01N 2291/0289; B21K 1/765; B23K 15/0006; B23K 31/125; F16C 3/023; G05B 19/4183; G05B 19/41875
USPC ..................... 73/622, 588; 228/104; 700/110
See application file for complete search history.

(56) References Cited

U.S. PATENT DOCUMENTS

| | | | | | |
|---|---|---|---|---|---|
| 4,562,392 | A | * | 12/1985 | Davis .................... | G01B 21/10 318/39 |
| 4,586,379 | A | * | 5/1986 | Burkhardt, Jr. ...... | G01N 29/265 73/622 |
| 4,857,260 | A | | 8/1989 | Schoenig, Jr. et al. | |
| 5,602,885 | A | * | 2/1997 | Ahmed ................. | B23K 31/02 376/248 |
| 6,155,475 | A | * | 12/2000 | Ekelof ................. | B23K 9/1274 219/124.22 |
| 6,268,697 | B1 | * | 7/2001 | Nishida ..................... | H01J 9/14 313/607 |
| 6,299,050 | B1 | * | 10/2001 | Okamura ............. | B23K 20/123 156/73.5 |
| 7,805,639 | B2 | * | 9/2010 | Mock .................... | H04L 41/064 700/110 |
| 2002/0013635 | A1 | * | 1/2002 | Gotou ................. | G01M 13/045 700/108 |
| 2006/0288756 | A1 | * | 12/2006 | De Meurechy ...... | G01N 17/006 73/1.01 |
| 2009/0095087 | A1 | * | 4/2009 | Yamano ............... | G01N 29/225 73/622 |
| 2009/0216360 | A1 | * | 8/2009 | Ikeda ........................ | F16C 3/02 700/110 |
| 2010/0123080 | A1 | * | 5/2010 | Andres ................ | B23K 9/0956 250/341.6 |
| 2011/0296923 | A1 | * | 12/2011 | Cataldo ................ | G01N 29/043 73/632 |
| 2012/0125899 | A1 | * | 5/2012 | Oh ........................ | B23K 26/032 219/121.64 |
| 2012/0288341 | A1 | * | 11/2012 | Terada ..................... | B23C 3/04 409/131 |
| 2014/0042208 | A1 | * | 2/2014 | Uchida ................ | B23K 31/125 228/103 |
| 2014/0115857 | A1 | * | 5/2014 | Hatano ................. | B23P 19/086 29/407.1 |
| 2014/0291301 | A1 | | 10/2014 | Tosaji et al. | |
| 2014/0318250 | A1 | | 10/2014 | Arai et al. | |

FOREIGN PATENT DOCUMENTS

| | | | | |
|---|---|---|---|---|
| JP | 62-70706 | | 4/1987 | |
| JP | 6-102258 | | 4/1994 | |
| JP | 7-48069 | | 5/1995 | |
| JP | 11-77363 | | 3/1999 | |
| JP | 2004-188455 | | 7/2004 | |
| JP | 2006-048102 | | 2/2006 | |
| JP | 3858500 | | 12/2006 | |
| JP | 2007-187593 | | 7/2007 | |
| JP | 2008-20192 | | 1/2008 | |
| JP | 2011-163814 | | 8/2011 | |
| JP | 2012-57696 | | 3/2012 | |
| JP | 2012229714 A | * | 11/2012 | |
| JP | 2013-2586 | | 1/2013 | |
| JP | 2013002586 A | * | 1/2013 | |
| JP | 2013-100859 | | 5/2013 | |
| JP | 2013-156104 | | 8/2013 | |
| WO | WO-2012032926 A1 | * | 3/2012 | ........... B23K 20/129 |
| WO | 2013/076850 | | 5/2013 | |
| WO | WO-2013069433 A1 | * | 5/2013 | .............. F16C 3/023 |

OTHER PUBLICATIONS

Extended European Search Report dated Mar. 16, 2018 in corresponding European Patent Application No. 15832013.5.
International Preliminary Report on Patentability and Written Opinion of the International Searching Authority dated Feb. 14, 2017 in corresponding International (PCT) Application No. PCT/JP2015/070922.
International Search Report dated Sep. 29, 2015 in International (PCT) Application No. PCT/JP2015/070922.

\* cited by examiner

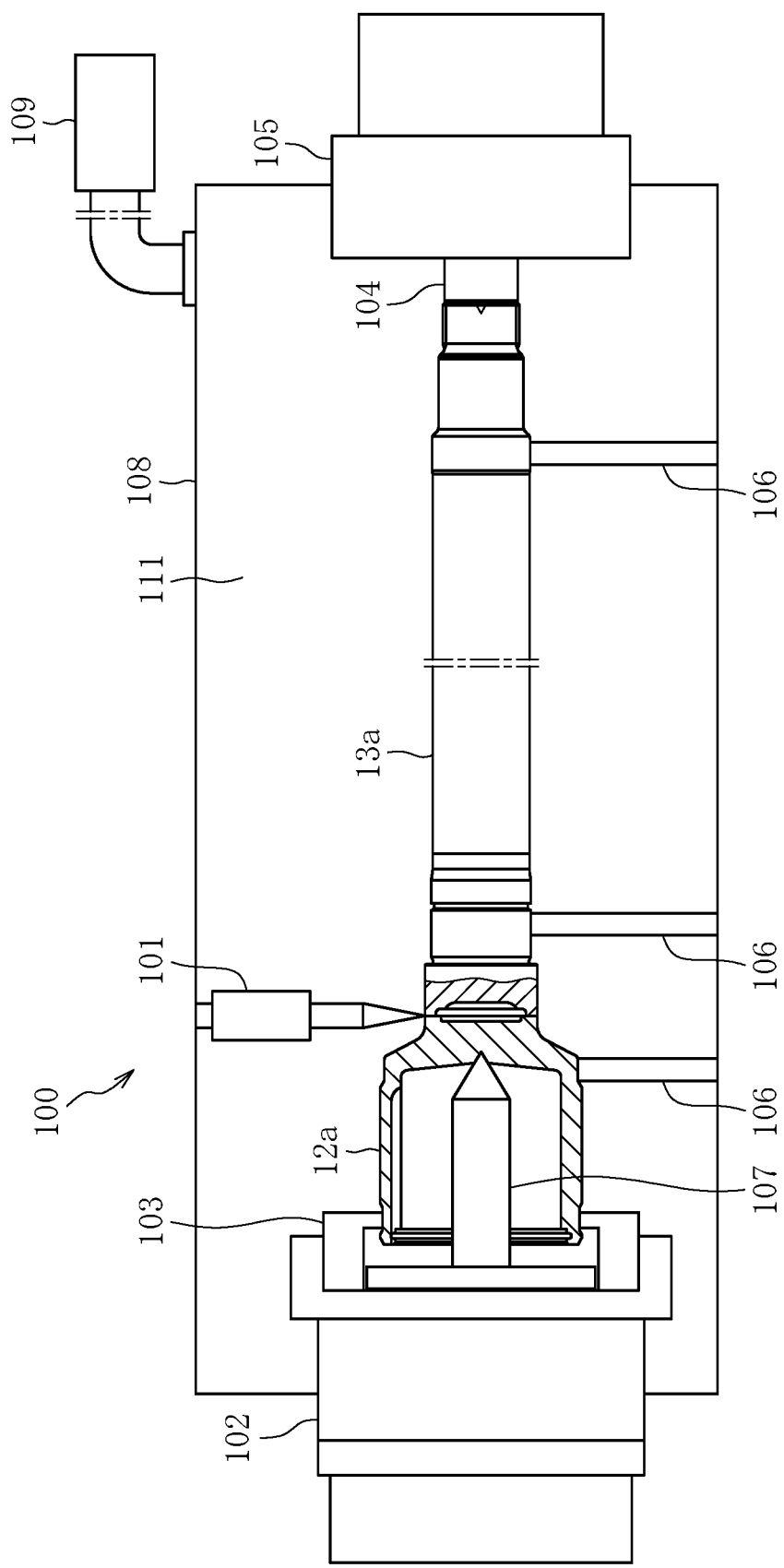

TYPES OF WELDING DEFECT AND INSPECTION METHOD

| TYPES OF DEFECT | | DEFECT PORTION | DETECTION METHOD |
|---|---|---|---|
| (1) | WELDING DISTORTION (DEFLECTION) | SURFACE | CONTACT-TYPE GAUGE |
| (2) | PIT | SURFACE | LASER DISPLACEMENT METER |
| (3) | POOR PENETRATION / UNWELDED SURFACE | INSIDE | ULTRASONIC FLAW DETECTION |
| (4) | BLOWHOLE WELD CRACK | INSIDE | ULTRASONIC FLAW DETECTION |

MEASUREMENT RESULT OF LASER DISPLACEMENT METER

FIG.11a

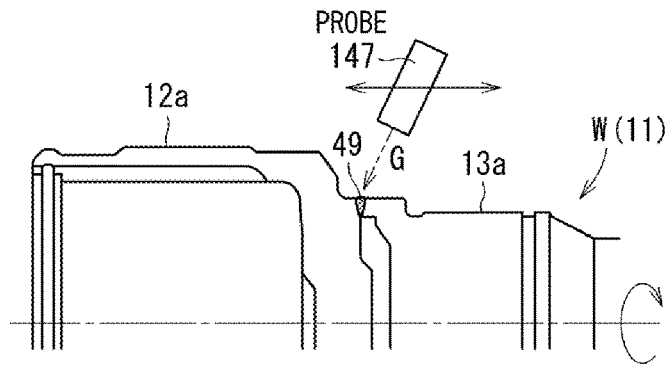

FIG.11b

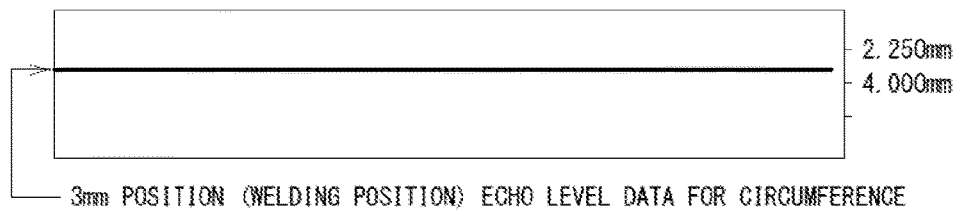

FIG.11c

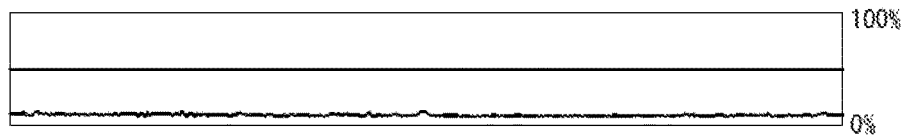

FIG.12

| ITEMS | | CONTENTS TO BE RECORDED | | | STORAGE |
|---|---|---|---|---|---|
| | | SET VALUE | ACTUAL MEASURED VALUE | DETERMINATION RESULT | |
| SUBJECT MODEL NUMBER | | ○ | — | — | RECORD WITH MARKED INFORMATION IN LINE BASE UNIT |
| INSPECTION COMPLETION TIME | | — | ○ | — | |
| PIT | | ○UPPER LIMIT/LOWER LIMIT | ○ | ○ | |
| POOR PENETRATION | | — | — | ○ | |
| DEGREE OF VACUUM· WELDING CONDITION | | ○UPPER LIMIT/LOWER LIMIT | ○ | ○ | |
| INTERNAL DEFECT MEASUREMENT | CUP SIDE | ○UPPER LIMIT | ○ | ○ | |
| | STEM SIDE | ○UPPER LIMIT | ○ | ○ | |
| WELDING DEPTH (DETAILED FLAW DETECTION DATA) | | ○ | ○ | ○ | ULTRASONIC FLAW DETECTION DEVICE |

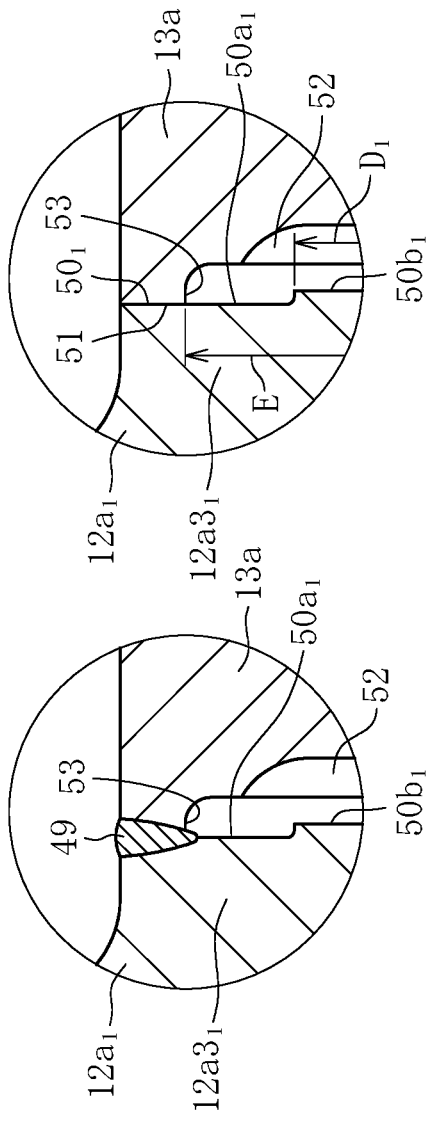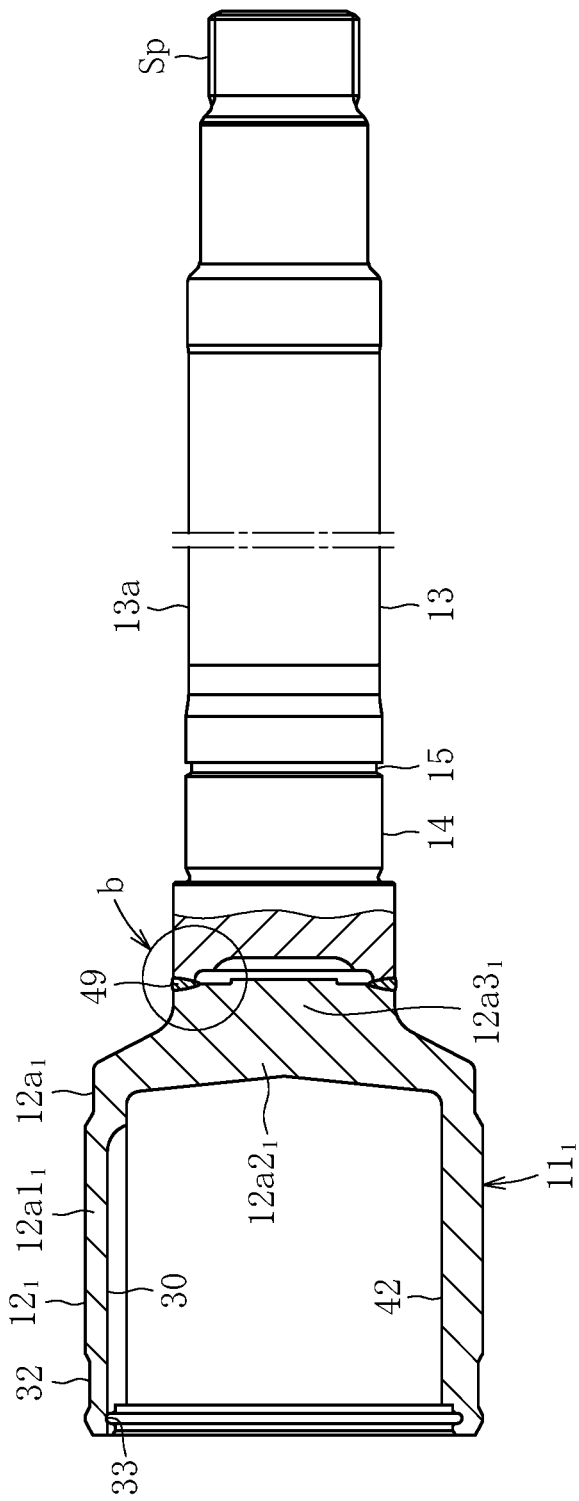

DEVICE FOR INSPECTING JUNCTION-TYPE OUTER JOINT MEMBER OF CONSTANT VELOCITY UNIVERSAL JOINT

TECHNICAL FIELD

This invention relates to an inspection device for an outer joint member of a constant velocity universal joint, in particular, an outer joint member which is obtained through melt-welding on a cup member and a shaft member (hereinafter referred to as "joint-type outer joint member").

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, the plunging type constant velocity universal joint is used on a differential side (inboard side), and the fixed type constant velocity universal joint is used on a driving wheel side (outboard side).

Irrespective of the fixed type and the plunging type, the constant velocity universal joint includes, as main components, an inner joint member, an outer joint member, and torque transmission members. The outer joint member includes a cup section and a shaft section. The cup section has track grooves formed in an inner peripheral surface thereof and configured to allow the torque transmission members to roll thereon. The shaft section extends from a bottom of the cup section in an axial direction. In many cases, the outer joint member is constructed by integrally forming the cup section and the shaft section by subjecting a rod-like solid blank, that is, a round bar to plastic working such as forging and ironing or processing such as cutting work, heat treatment, and grinding.

Incidentally, an outer joint member (long stem type) including a shaft section longer than a standard may sometimes be used. For example, in order to equalize lengths of a right part and a left part of the drive shaft, the long stem type is used for a constant velocity universal joint on the inboard side that corresponds to one side of the drive shaft. In this case, the shaft section is rotatably supported by a support bearing. Although varied depending on vehicle types, the length of the shaft section of the long stem type is approximately from 300 mm to 400 mm in general. The outer joint member of the long stem type has a long shaft section, and hence there is a difficulty in integrally forming the cup section and the shaft section with high accuracy. Therefore, there is known an outer joint member in which the cup section and the shaft section are formed as separate members, and both the members are joined through friction press-contact (Patent Literature 1).

An overview of the friction press-contact technology for the outer joint member described in Patent Literature 1 is described below. First, as illustrated in FIG. 28, a cup member 72 and a shaft member 73 are joined through the friction press-contact to form an intermediate product 71'. Next, burrs 75 on a radially outer side of a joining portion 74 are removed, and hence an outer joint member 71 as illustrated in FIG. 29 is obtained. The burrs 75 are generated on the joining portion 74 of the intermediate product 71' along with the press-contact. The burrs 75 on the radially outer side of the joining portion 74 are removed through processing such as turning. Accordingly, a support bearing (rolling bearing 6: see FIG. 1) to a shaft section of the outer joint member 71.

Although illustration is omitted, the intermediate product 71' is processed into a finished product of the outer joint member 71 through machining of a spline, snap ring grooves, and the like, and through heat treatment, grinding, and the like. Therefore, the outer joint member 71 and the intermediate product 71' have slight differences in shape. However, illustration of the slight differences in shape is omitted in FIG. 28 and FIG. 29 to simplify the description, and the outer joint member 71 being the finished product and the intermediate product 71' are denoted by the reference symbols at the same parts. The same applies to the description below.

CITATION LIST

Patent Literature 1: JP 2012-057696 A
Patent Literature 2: JP 2013-100859 A
Patent Literature 3: JP 07-48069 B
Patent Literature 4: JP 3858500 B2

SUMMARY OF INVENTION

Technical Problem

The burrs 75 on the joining portion 74, which are generated due to the friction press-contact, not only are quenched by friction heat and cooling that follows the friction heat to have a high hardness but also have a distorted shape extended in an axial direction and a radial direction. Therefore, when removing the burrs 75 on the radially outer side through the turning, a tip for turning is liable to be significantly abraded due to the high hardness and cracked due to the distorted shape. Therefore, it is difficult to increase the turning speed. In addition, a cutting amount per pass of the tip for turning is decreased, and hence the number of passes is increased, which causes a problem in that the cycle time is increased to increase the manufacturing cost.

Further, in order to inspect a joining state of the joining portion 74 of the outer joint member 71, when ultrasonic flaw detection, which enables flaw detection at high speed, is to be performed, an ultrasonic wave is scattered due to the burrs 75 remaining on the radially inner side of the joining portion 74, and hence the joining state cannot be checked. Therefore, there occurs a problem in that total inspection through the ultrasonic flaw detection cannot be performed after the joining.

To cope with the above-mentioned problems, it is conceivable to employ melt-welding to suppress a bulge on a surface of a joining portion which may be formed in a case of friction press-contact. In Patent Literature 2, it is described that butt-welding is performed through melt-welding such as electron beam welding and laser welding. However, as illustrated in FIG. 30, when the cup member 72, which has an elongated hollow cavity portion extending from a joining end surface in an axial direction, and the shaft member 73 are brought into abutment against each other to be welded, a hollow cavity portion 76 having a relatively large volume is formed. Then, the pressure in the hollow cavity portion 76 is increased due to processing heat during the welding, and after completion of the welding, the pressure is decreased. Due to such variation in the internal pressure of the hollow cavity portion 76, blowing of a molten material may occur. The blowing of a molten material may cause defects such as a recess (pit) in a surface of the welded portion, poor penetration, an internal blowhole, and a weld crack, thereby degrading welding quality. As a result, strength of the welded portion is not stable, which adversely affects quality of a product. In this case, the welded portion is formed into an annular shape, and a surface of a bead can be visually observed. However, a back surface (back bead) of the welded portion cannot be observed. Thus, in order to detect a penetration depth, the presence or absence of poor penetration, and the presence or absence of an internal defect in the welded portion, it is necessary to perform nondestructive inspection.

Now, methods of inspecting the welded portion are roughly classified. There are visual inspection, penetration flaw detection, magnetic powder flaw detection, and eddy current flaw detection for detection of a defect on a surface. Further, there are ultrasonic flaw detection and X-ray inspection for detection of an internal defect. In addition, inspection such as shape measurement, hardness measurement, and structure observation may be performed as needed. The ultrasonic flaw detection and the visual inspection through image processing are suited to automatic inspection in a line, and inspection systems in accordance with characteristics of products have been practically used (see Patent Literatures 3 and 4).

With regard to the joint-type outer joint member, a cup member and a stem member, which are formed separately, are joined through melt-welding for the purpose of improving efficiency through integration of manufacturing steps and standardization of components. In order to perform inspection for a welded portion of such joint-type outer joint member through in-line total inspection, it is necessary to construct an inspection system in accordance with characteristics of welding of the joint-type outer joint member.

Further, from an aspect of a production technology, the following problem has been found in the course of pursuing quality and reliability of the welded portion formed through melt-welding. That is, it is necessary to meet a demand for traceability while securing productivity of a constant velocity universal joint being a mass-produced product for an automobile and the like. Mass production of the joint-type outer joint member through melt-welding has not hitherto been performed. Thus, methods of inspection and quality management therefor have not been established. Further, a constant velocity universal joint for an automobile is an important safety-related component. Thus, it is essential to secure the traceability.

It is an object of the present invention to provide an inspection device which is configured to efficiently perform in-line total inspection for a joint-type outer joint member obtained through melt-welding.

Solution to Problem

In order to achieve the above-mentioned object, according to one embodiment of the present invention, there is provided an inspection device for a joint-type outer joint member of a constant velocity universal joint, the joint-type outer joint member comprising: a cup section having a bottomed cylindrical shape and having track grooves in an inner periphery thereof to allow torque transmitting elements to roll therein; and a shaft section extending from a bottom of the cup section, the joint-type outer joint member being obtained through welding (melt-welding) of a cup member forming the cup section and a shaft member forming the shaft section, the inspection device comprising: a surface inspection unit configured to perform inspection for detecting a defect which appears on a surface of the joint-type outer joint member due to welding; an internal inspection unit configured to perform inspection of an internal defect of a welded portion; and a recording unit configured to record an inspection result of the inspection.

Defects caused by welding can be roughly classified into defects which appear on a surface, such as welding distortion and a pit formed in a bead surface of the welded portion, and internal defects of the welded portion, such as poor penetration, a blowhole, and a weld crack (see FIG. 8b). The surface inspection unit of the inspection device is for use in inspection of the defects which appear on a surface, and the internal inspection unit is for use in inspection of the internal defects. Here, the welded portion is a generic name of a portion including a welded metal and a heat-affected portion. The welded metal is metal which forms part of the welded portion and is molten and solidified during welding. The heat-affected portion is a portion which is changed in structure, metallurgical property, mechanical property, and the like by heat of welding and is unmolten part of a base material (JIS Z 3001-1 Welding Terms—Section 1: General). The pit, the poor penetration, the blowhole, the weld crack, and the welding distortion which are mentioned below are also welding terms specified by JIS.

The welding distortion refers to a state in which a workpiece is deformed due to positional displacement of joining surfaces and welding heat. The welding distortion is detected as deflection of the workpiece, that is, the joint-type outer joint member (see FIG. 8b (1)). That is, deflection measurement is performed by bringing a contact-type gauge into contact with a workpiece while rotating the workpiece. When an electric dial gauge is used and connected to a computer of a recording unit through intermediation of an interface, reading (measured value) of the dial gauge is recorded in association with a product number of each workpiece (marked for identification of a workpiece, thus named "product number" in that sense). Further, a workpiece W having a measured value exceeding a preset upper limit is determined as being defective and removed from a line in an appropriate stage.

The constant velocity universal joint constructs a power transmission system, and its outer joint member of a long stem type in particular is a rotary component for use in a drive shaft for a front wheel. Therefore, when a cup section and a shaft section are displaced at centers thereof or are curved as a whole, depending on the degree of displacement or curve, not only degradation in strength and durability but also adverse effects on operation stability of the vehicle are conceivable. Thus, in a welding step, it is important to sufficiently perform alignment of joining end surfaces and management for pre-heating and post-heating during the welding step to suppress or reduce occurrence of weld deformation as much as possible. In addition, it is necessary to reliably detect a defective workpiece, which has deflection exceeding the preset upper limit, through inspection and to remove the defective workpiece from a line.

The pit refers to a small recess hole formed in a surface of a bead (see FIG. 8b (2)). When a laser displacement meter is used to detect the presence or absence of the pit. Then, the pit is detected, the depth of the pit is measured. Then, the depth is recorded in association with a product number of each workpiece. The pit affects strength. Thus, a workpiece having a depth exceeding a preset upper limit is determined as being defective and removed from a line in an appropriate stage.

The poor penetration refers to the presence of a non-penetrating portion in a case of a full penetration welded joint (see FIG. 8b (3)). With regard to the poor penetration, in the internal inspection unit, an ultrasonic flaw detection device is used to detect a radially inner end portion of a welded portion to measure the penetration depth. Then, the penetration depth is recorded in association with a product number of each workpiece. When the penetration depth does not meet a preset criterion, it is determined that poor penetration has occurred, and the workpiece is removed from a line in an appropriate stage. The poor penetration indicates the presence of an unwelded surface. In that case, stress concentration occurs at an end of the welded portion, which may be problematic in view of strength. Thus, it is desirable to reliably remove the defective workpiece.

The blowhole refers to a spherical or substantially spherical hollow cavity which is formed in a weld metal (see FIG. 8b (4)). The pit is a small hole which is opened in the surface, whereas the blowhole is an internal defect. Those portions are sometimes generically referred to as porosity. The weld crack is a generic name of a crack-like defect formed in the welded portion (see FIG. 8b (4)). During welding, there is a case where the blowhole, which is formed due to incorporation of air and shield gas, and the weld crack, which is formed due to expansion and contraction caused by welding heat, are formed.

The internal defects of the welded portion such as the blowhole and the weld crack may cause degradation in product strength. Thus, in the welding step, it is important to sufficiently manage welding conditions to suppress formation of the blowhole and the weld crack. For example, when welding is performed in a vacuum chamber, appropriate management for the degree of vacuum may cause the blowhole less liable to be formed. Further, when pre-heating and post-heating are performed to prevent rapid expansion and contraction caused by the welding heat, formation of the weld crack can also be suppressed. In order to verify the presence or absence of those internal defects, the ultrasonic flaw detection device is used to perform inspection over an entire region of the welded portion. The inspection result, that is, the presence or absence of the internal defect and echo level data thereof are recorded in association with a product number of each workpiece. A workpiece in which the blowhole or the weld crack is detected is removed from a line in an appropriate stage.

The recording unit can record inspection results, which include inspection items and measured values related to each workpiece, in association with a product number of the workpiece.

Advantageous Effects of Invention

According to the present invention, the inspection device comprises the surface inspection unit configured to perform inspection for detecting a defect which appears on the surface of the outer joint member due to welding, the internal inspection unit configured to perform inspection of the internal defect of the welded portion, and the recording unit configured to record the inspection result. Thus, an efficient inspection device which can perform in-line total inspection suited to the joint-type outer joint member of the constant velocity universal joint can be provided. Further, through use of the inspection device, quality of the joint-type outer joint member can be guaranteed, and quality management securing traceability can also be performed.

Further, a welding defect which is difficult to be detected only through the related-art ultrasonic flaw detection can also be detected. Further, inspection such as visual inspection through visual confirmation by an operator and destructive inspection, which requires skill and is time-consuming, can be eliminated, thereby being capable of contributing to shortening of lead time. Further, in destructive inspection or sampling inspection, it is necessary to stop a line and take out a workpiece, which not only is time-consuming but also hinders traceability for all workpieces.

BRIEF DESCRIPTION OF DRAWINGS

FIG. 2a is an enlarged view of a first embodiment of the outer joint member of the plunging type constant velocity universal joint of FIG. 1.

FIG. 2b is an enlarged view of a portion "b" of FIG. 2a.

FIG. 2c is an enlarged view, which is similar to FIG. 2b, for illustrating a state before welding.

FIG. 7 is a schematic elevation view of the welding apparatus during welding.

FIG. 11a is a schematic sectional view for illustrating an overview of inspection for a welded portion through use of an ultrasonic flaw detection device.

FIG. 11b is a development diagram for illustrating echo level data (criterion) for a circumference of the welding position.

FIG. 11c is a development diagram for illustrating measured values of a reflected echo.

FIG. 12 is a table for showing a relationship among inspection items, inspection results, and a storage.

FIG. 22a is a partial sectional front view for illustrating a second embodiment of the outer joint member.

FIG. 22b is an enlarged view of a portion "b" of FIG. 22a.

FIG. 22c is an enlarged view, which is similar to FIG. 22b, for illustrating a state before welding.

FIG. 23 is a vertical sectional view of the cup member of FIG. 22a.

DESCRIPTION OF EMBODIMENTS

Now, description is made of embodiments of the present invention with reference to the drawings.

First, a first embodiment of an outer joint member is described with reference to FIG. 1 and FIG. 2, and subsequently, a first embodiment of a method of manufacturing the outer joint member is described with reference to FIG. 3 to FIG. 18.

Figure 1:
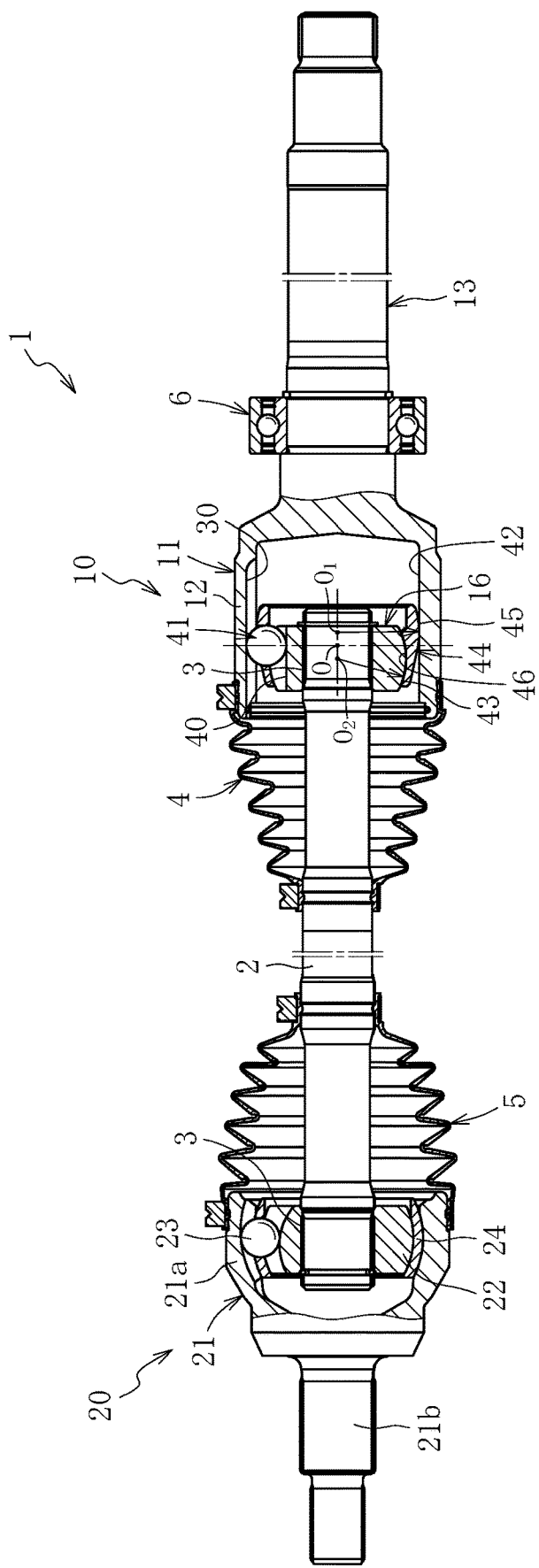
FIG. 1 is a partial sectional front view of a drive shaft including a plunging type constant velocity universal joint with an outer joint member of a long stem type.
Figure 2:
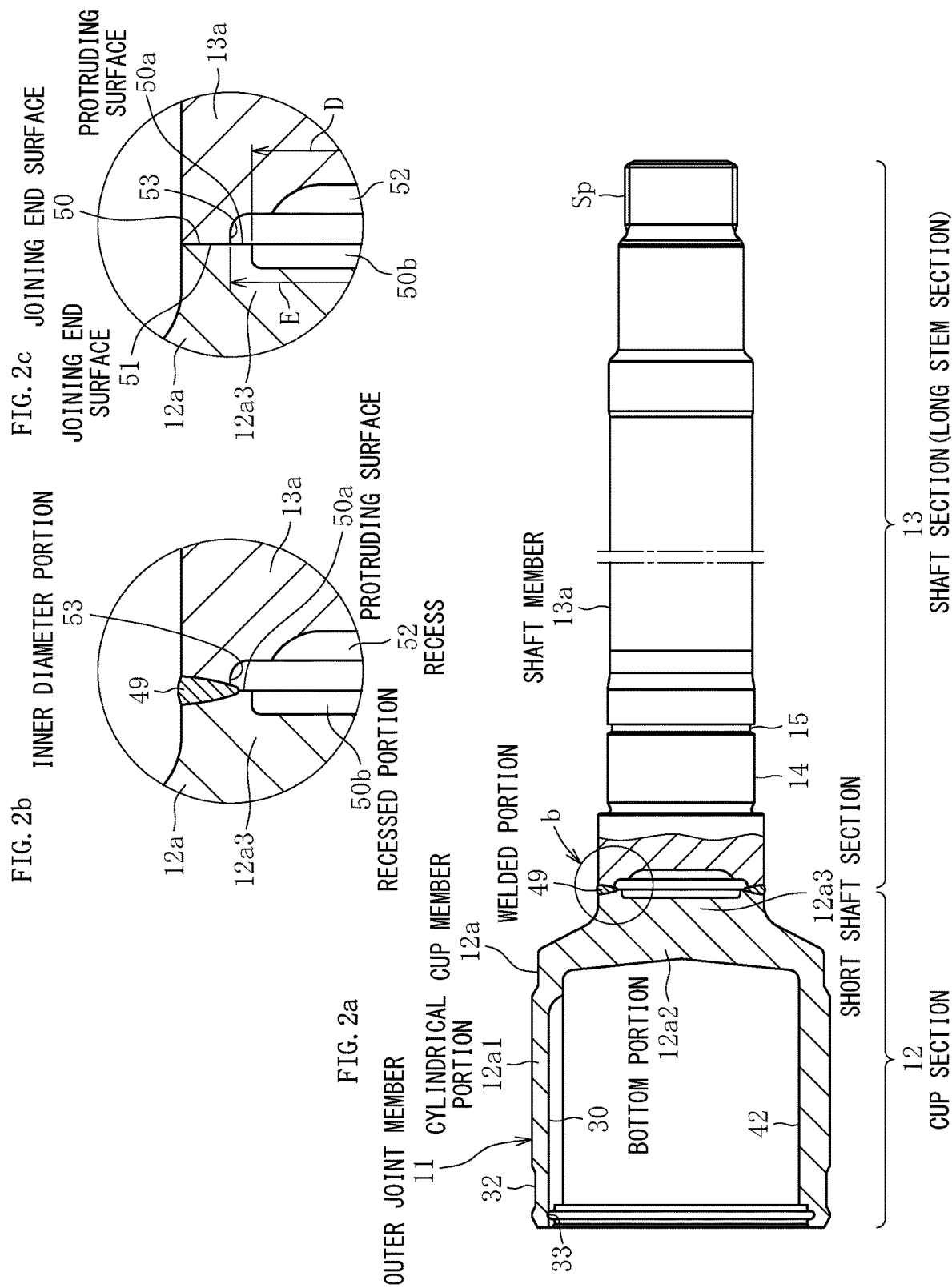

FIG. 1 is a view for illustrating the entire structure of a drive shaft 1. The drive shaft 1 mainly comprises a plunging type constant velocity universal joint 10, a fixed type constant velocity universal joint 20, and an intermediate shaft 2 configured to couple both the joints 10 and 20. The plunging type constant velocity universal joint 10 is arranged on a differential side (right side of FIG. 1: hereinafter also referred to as "inboard side"), and the fixed type constant velocity universal joint 20 is arranged on a driving wheel side (left side of FIG. 1: hereinafter also referred to as "outboard side").

The plunging type constant velocity universal joint 10 is a so-called double-offset type constant velocity universal joint (DOJ), and mainly comprises an outer joint member 11, an inner joint member 16, a plurality of balls 41 serving as torque transmitting elements, and a cage 44 configured to retain the balls 41.

The outer joint member 11 comprises a cup section 12 and a long shaft section (hereinafter also referred to as "long stem section") 13 that extends from a bottom of the cup section 12 in an axial direction. The inner joint member 16 is housed in the cup section 12 of the outer joint member 11. Track grooves 30 formed along an inner periphery of the cup section 12 of the outer joint member 11 and track grooves 40 formed along an outer periphery of the inner joint member 16 form pairs, and the balls 41 are arranged between the track grooves 30 and 40 of respective pairs. The cage 44 is interposed between the outer joint member 11 and the inner joint member 16, and is held in contact with a partially cylindrical inner peripheral surface 42 of the outer joint member 11 at a spherical outer peripheral surface 45 and held in contact with a spherical outer peripheral surface 43 of the inner joint member 16 at a spherical inner peripheral surface 46. A curvature center $O_1$ of the spherical outer peripheral surface 45 and a curvature center $O_2$ of the spherical inner peripheral surface 46 of the cage 44 are offset equidistantly from a joint center O toward opposite sides in the axial direction.

An inner ring of a support bearing 6 is fixed to an outer peripheral surface of the long stem section 13, and an outer ring of the support bearing 6 is fixed to a transmission case with a bracket (not shown). As described above, the outer joint member 11 is supported by the support bearing 6 in a freely rotatable manner, and hence vibration of the outer joint member 11 during driving or the like is prevented as much as possible.

The fixed type constant velocity universal joint 20 is a so-called Rzeppa type constant velocity universal joint, and mainly comprises an outer joint member 21, an inner joint member 22, a plurality of balls 23 serving as torque transmitting elements, and a cage 24 configured to retain the balls 23. The outer joint member 21 comprises a bottomed cylindrical cup section 21a and a shaft section 21b that extends from a bottom of the cup section 21a in the axial direction. The inner joint member 22 is housed in the cup section 21a of the outer joint member 21. The balls 23 are arranged between the cup section 21a of the outer joint member 21 and the inner joint member 22. The cage is interposed between an inner peripheral surface of the cup section 21a of the outer joint member 21 and an outer peripheral surface of the inner joint member 22.

Note that, as the fixed type constant velocity universal joint, an undercut-free type constant velocity universal joint may sometimes be used.

The intermediate shaft 2 comprises spline (including serrations; the same applies hereinafter) shafts 3 on both end portions thereof. The spline shaft 3 on the inboard side is inserted to a spline hole of the inner joint member 16 of the plunging type constant velocity universal joint 10. Thus, the intermediate shaft 2 and the inner joint member 16 of the plunging type constant velocity universal joint 10 are coupled to each other to allow torque transmission therebetween. Further, the spline shaft 3 on the outboard side is inserted to a spline hole of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the example of the solid intermediate shaft 2 is illustrated, a hollow intermediate shaft may also be used.

Grease is sealed inside both the constant velocity universal joints 10 and 20 as a lubricant. To prevent leakage of the grease or entry of a foreign matter, bellows boots 4 and 5 are respectively mounted to a portion between the outer joint member 11 of the plunging type constant velocity universal joint 10 and the intermediate shaft 2, and a portion between the outer joint member 21 of the fixed type constant velocity universal joint 20 and the intermediate shaft 2.

Next, details of the outer joint member 11 are described with reference to FIG. 2.

As illustrated in FIG. 2a, the outer joint member 11 comprises the cup section 12 and the shaft section (long stem section) 13. The outer joint member 11 is manufactured by joining the cup member 12a and the shaft member 13a through butt welding, and manufacturing steps are described later in detail.

The cup section 12 has a bottomed cylindrical shape that is opened at one end, and the inner peripheral surface 42 has the plurality of track grooves 30 that are formed equidistantly in a circumferential direction, thereby forming a partially cylindrical shape. The balls 41 (see FIG. 1) roll on the track grooves 30.

The cup member 12a forming the cup section 12 is an integrally-formed product being made of medium carbon steel, e.g., S53C, containing carbon of from 0.40 wt % to 0.60 wt %, and having a cylindrical portion 12a1 and a bottomportion 12a2. The cylindrical portion 12a1 has the track grooves 30 and the inner peripheral surface 42 described above. A boot mounting groove 32 is formed at an outer periphery of the cup member 12a on the opening side thereof, whereas a snap ring groove 33 is formed at an inner periphery. The bottom portion 12a2 has a shaft section having a solid shaft shape protruding toward the shaft member 13a side, that is, a short shaft section 12a3, and a joining end surface 50 (FIG. 2c) is formed at the short shaft section 12a3. The solid shaft shape is intended to exclude a shaft having a hollow cavity portion penetrating in an axial direction, or a shaft having an elongated hollow cavity portion extending from a joining end surface in the axial direction (see Patent Literatures 1 and 2). The cup member has a bottomed cylindrical shape as a whole, but the short shaft section 12a3 having the joining end surface formed thereon does not have a through hole and an elongated hollow cavity portion extending from the joining end surface in the axial direction. Thus, at least the short shaft section 12a3 has the solid shaft shape.

The joining end surface 50 is finished by turning. Herein, a shallow recessed portion 50b is formed on a radially inner side of the joining end surface 50, and as a result, the annular joining end surface 50 is formed on a radially outer side of the recessed portion 50b. The reference symbol D denotes an inner diameter of the joining end surface 50. The recessed portion 50b may be formed during forging, or may be formed by cutting. When the recessed portion 50b is formed during forging, the number of steps can be reduced. Further, the joining end surface 50 is formed into an annular shape, and hence time required for turning can be reduced.

The shaft section 13 is a solid shaft that extends from the bottom of the cup section 12 in the axial direction. A bearing mounting surface 14 and a snap ring groove 15 are formed at an outer periphery of the shaft section 13 on the cup member 12a side, whereas a spline shaft Sp serving as a torque transmission coupling portion is formed at an end portion on a side opposite to the cup section 12.

The shaft member 13a forming the shaft section 13 is made of medium carbon steel, e.g., S40C, containing carbon of from 0.30 wt % to 0.55 wt %. A joining end surface 51 (FIG. 2c) is formed at an end portion on the cup member 12a side. The joining end surface 51 has a recess 52 formed on the radially inner side thereof, and as a result, is formed into an annular surface. The reference symbol E denotes an inner diameter of the joining end surface 51. FIG. 2 and FIG. 5 are illustrations of an example in which the recess 52 is formed during forging and in which the inner diameter portion 53 is formed in the joining end surface 51 by cutting. Thus, it appears as if the recess 52 and the inner diameter portion 53 are formed into a hole having stages. However, the inner diameter portion 53 may be an inner diameter portion of the joining end surface 51, or may be an inner diameter portion of the recess 52. The recess 52 may maintain a forged surface. In that case, the inner diameter portion 53 that can be clearly distinguished from the recess 52 does not appear as illustrated.

The recess 52 has a shallow bottom, that is, is very shallow with respect to a diameter of the joining end surface 51. As an example of the depth, a lower limit is approximately 1 mm. That is intended to secure a straight portion having a length in the axial direction necessary to perform ultrasonic flaw detection for defectiveness in dimension in the radial direction (penetration depth) of a welded portion 49. The above-mentioned lower limit is a value in view of the ultrasonic flaw detection. In view of reducing the preheating time through reduction of a volume near the joining portion, a corresponding depth of the recess 52 is desired.

In the case of forming the recessed portion during forging, an upper limit of the depth of the recess 52 is approximately a limit value formed through forging (reference)×1.5 mm. Excessively deep recess 52 may cause increase in forging load, degradation of die lifetime, and increase in processing cost. Even in the case of forming through cutting, excessively deep recess 52 may cause longer processing time and poor material yield.

The inner diameter portion 53 of the joining end surface 51, while being dependent on the outer diameter of the shaft member 13a, is presupposed to secure a radial width of the welded portion 49 to be formed on the outer diameter side of the recess 52. The term "diameter" of the inner diameter is generally associated with a circular shape. However, a contour of the inner diameter portion 53 as viewed from a plane perpendicular to the axial line of the shaft member 13a is not limited to have a circular shape, and the shape may be, for example, a polygon or an irregular shape.

Welding is performed by bringing the joining end surface 50 of the cup member 12a and the joining end surface 51 of the shaft member 13a into abutment against each other and irradiating an electron beam from an outer side of the cup member 12a in the radial direction (FIG. 2a and FIG. 2b). As described above, the welded portion 49 comprises metal that is molten and solidified during welding, that is, a molten metal and a heat-affected portion in a periphery of the molten metal.

Although detailed description is made later, outer diameters B of the joining end surfaces 50 and 51 (see FIG. 4b and FIG. 5c) are set to equal dimensions for each joint size. However, the outer diameter B of the joining end surface 50 of the cup member 12a and the outer diameter B of the joining end surface 51 of the shaft member 13a need not be set to equal dimensions. In consideration of, for example, a state of the bead, a dimensional difference may be given as appropriate in such a manner that the outer diameter B of the joining end surface 51 is set slightly smaller than the outer diameter B of the joining end surface 50 or the like. The dimensional relationship between the outer diameter B of the joining end surface 50 and the outer diameter B of the joining end surface 51 is the same throughout the Description.

The welded portion 49 is formed on the cup member 12a side with respect to the bearing mounting surface 14 of the shaft member 13a, and hence the bearing mounting surface 14 and the like can be processed in advance before welding so that post-processing after welding can be omitted. Further, in the electron beam welding, burrs are not generated at the welded portion. Thus, also on this point, post-processing for the welded portion can also be omitted, which can reduce manufacturing cost. Still further, total inspection on the welded portion through ultrasonic flaw detection can be performed.

As illustrated in FIG. 2c, an inner diameter D of the joining end surface 50 of the cup member 12a is set smaller than an inner diameter E of the inner diameter portion 53 of the joining end surface 51 of the shaft member 13a. In other words, the recessed portion 50b has a smaller diameter than the recess 52. As a result, the joining end surface 50 of the cup member 12a partially protrudes to a radially inner side with respect to the joining end surface 51 having the inner diameter E. This protruding portion is referred to as a protruding surface 50a. The joining end surfaces 50 and 51 having such a shape are brought into abutment against each other, and the cup member 12a and the shaft member 13a are joined by welding. The protruding surface 50a is formed to be the same for each joint size.

Next, the manufacturing method of the above-mentioned outer joint member is described with reference to FIG. 3 to FIG. 18. Before description of details of each manufacturing step, an overview of manufacturing steps is described.

Figure 3:
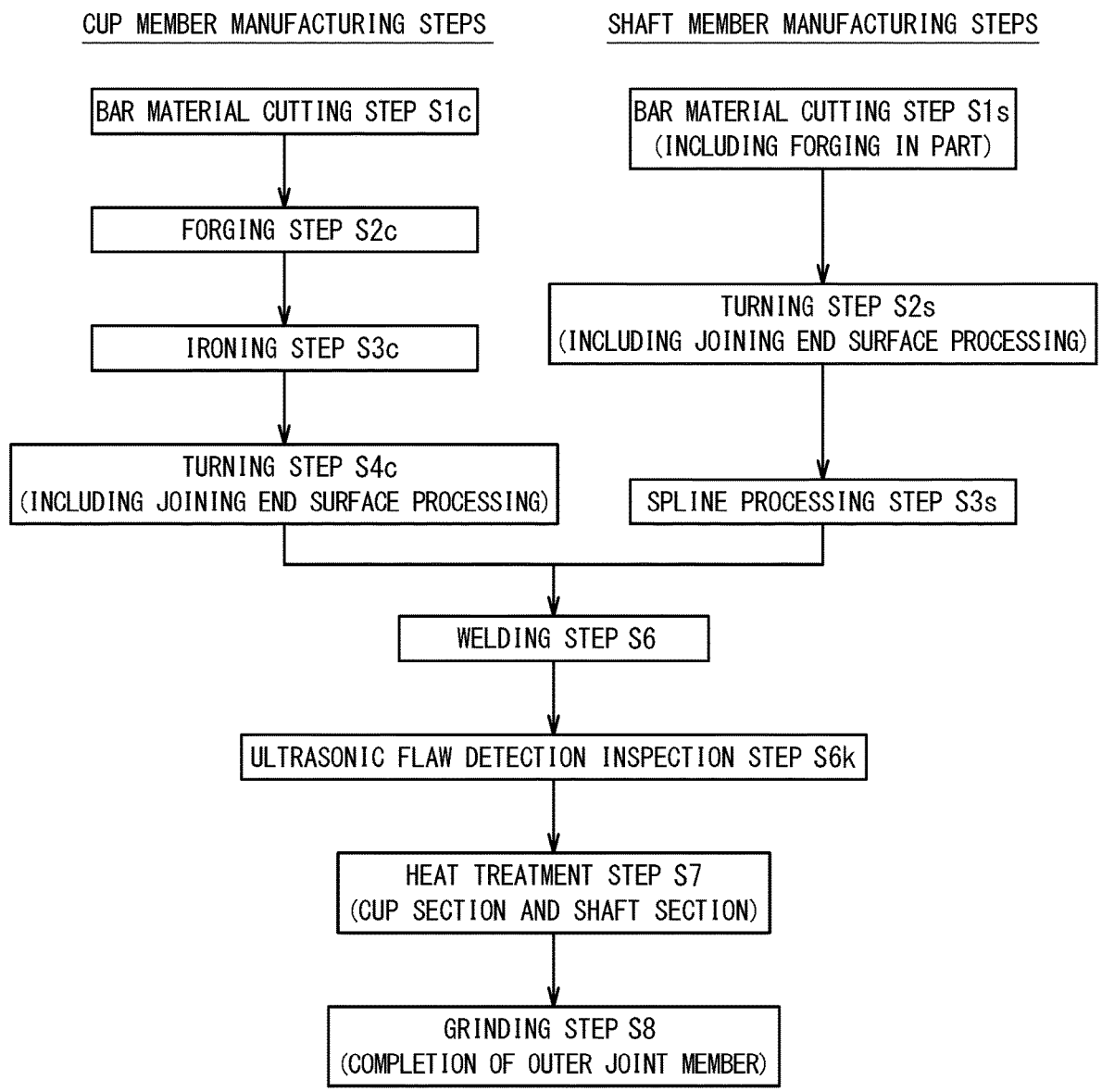
FIG. 3 is a block line diagram for illustrating manufacturing steps for the outer joint member of FIG. 2.

As illustrated in FIG. 3, the cup member 12a is manufactured through manufacturing steps comprising a bar material cutting step S1c, a forging step S2c, an ironing step S3c, and a turning step S4c.

Meanwhile, the shaft member 13a is manufactured through manufacturing steps comprising a bar material cutting step S1s, a turning step S2s, and a spline processing step S3s.

The cup member 12a and the shaft member 13a thus manufactured are each assigned with a product number for management. After that, the cup member 12a and the shaft member 13a are subjected to a welding step S6, an ultrasonic flaw detection step S6k, a heat treatment step S7, and a grinding step S8 so that the outer joint member 11 is completed.

An overview of each step is described below. Each step is described as a typical example, and appropriate modification and addition may be made as needed.

First, the manufacturing steps for the cup member 12a are described.

[Bar Material Cutting Step S1c]

A bar material (round bar) is cut into a predetermined length in accordance with a forging weight, thereby producing a columnar billet.

[Forging Step S2c]

The billet is subjected to forging so as to integrally form the cylindrical portion, the bottom portion, and the projecting portion as a preform of the cup member 12a.

[Ironing Step S3c]

Ironing is performed on the track grooves 30 and the cylindrical surface 42 of the preform, thereby finishing the inner periphery of the cylindrical portion of the cup member 12a.

[Turning Step S4c]

In the preform after ironing, the outer peripheral surface, the boot mounting groove 32, the snap ring groove 33 and the like, and the joining end surface 50 are formed by turning. After the turning step S4c, the cup member 12a in the form of an intermediate component is assigned with a product number for management.

Next, the manufacturing steps for the shaft member 13a are described.

[Bar Material Cutting Step S1s]

A bar material is cut into a predetermined length in accordance with an entire length of the shaft section, thereby producing a columnar billet. After that, the billet is forged into a rough shape by upset forging depending on the shape of the shaft member 13a.

[Turning Step S2s]

The outer peripheral surface of the billet (bearing mounting surface 14, snap ring groove 15, minor diameter of the spline, end surface, and the like) and the joining end surface 51 of the billet at the end portion on the cup member 12a side are formed by turning.

[Spline Processing Step S3s]

The spline shaft is formed by processing splines in the shaft member through rolling after turning. Note that, the method of processing the spline is not limited to the rolling, and press working or the like may be adopted instead as appropriate. After the spline processing, the shaft member 13a in the form of an intermediate component is assigned with a product number for management.

Next, the manufacturing steps in the process of completing the outer joint member 11 from the cup member 12a and the shaft member 13a in the form of the intermediate component obtained in the manner described above are described.

[Welding Step S6]

The joining end surface 50 of the cup member 12a and the joining end surface 51 of the shaft member 13a are brought into abutment against and welded to each other. This welding step is described later in detail.

[Ultrasonic Flaw Detection Step S6k]

The welded portion 49 between the cup member 12a and the shaft member 13a is inspected by ultrasonic flaw detection. This ultrasonic flaw detection step is also described later in detail.

[Heat Treatment Step S7]

High frequency quenching and tempering are performed as heat treatment on at least the track grooves 30 and the inner peripheral surface 42 of the cup section 12 after welding and a necessary range of the outer periphery of the shaft member 13 after welding. Heat treatment is not performed on the welded portion 49. A hardened layer having a hardness of approximately from 58 HRC to 62 HRC is formed on each of the track grooves 30 and the inner peripheral surface 42 of the cup section 12 by the heat treatment. Further, a hardened layer having a hardness of approximately from 50 HRC to 62 HRC is formed in a predetermined range of the outer periphery of the shaft section 13.

[Grinding Step S8]

After the heat treatment, the bearing mounting surface 14 of the shaft member 13 and the like are finished by grinding. Thus, the outer joint member 11 is completed.

As described above, the heat treatment step is provided after the welding step, and hence the manufacturing steps are suited to a cup member and a shaft member having such shapes and specifications that the hardness of the heat-treated portion may be affected by temperature rise at the periphery due to heat generated during the welding.

Main constituent features of the above-mentioned method of manufacturing the outer joint member are described more in detail.

Figure 4A:
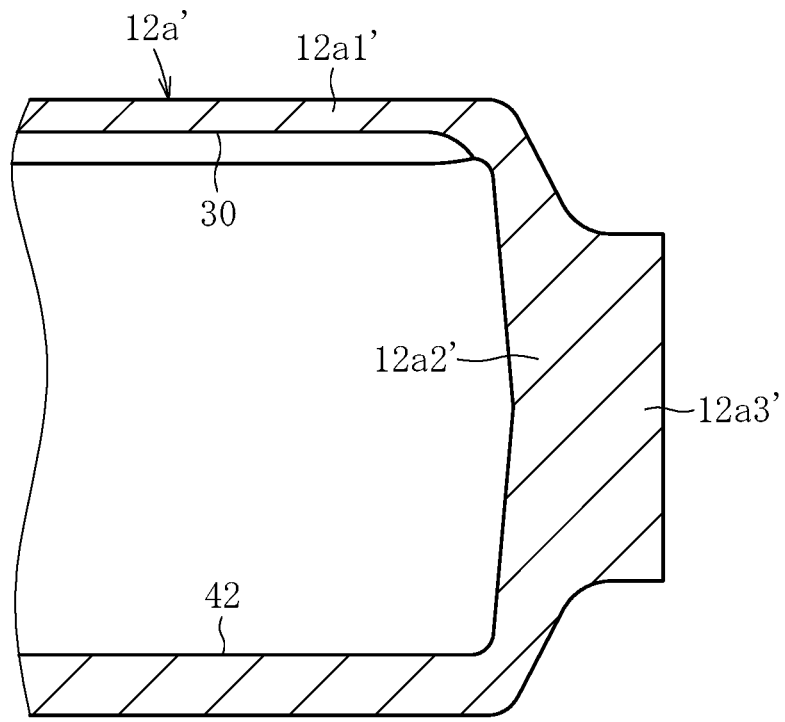
FIG. 4a is a vertical sectional view of a cup member after ironing.
Figure 4B:
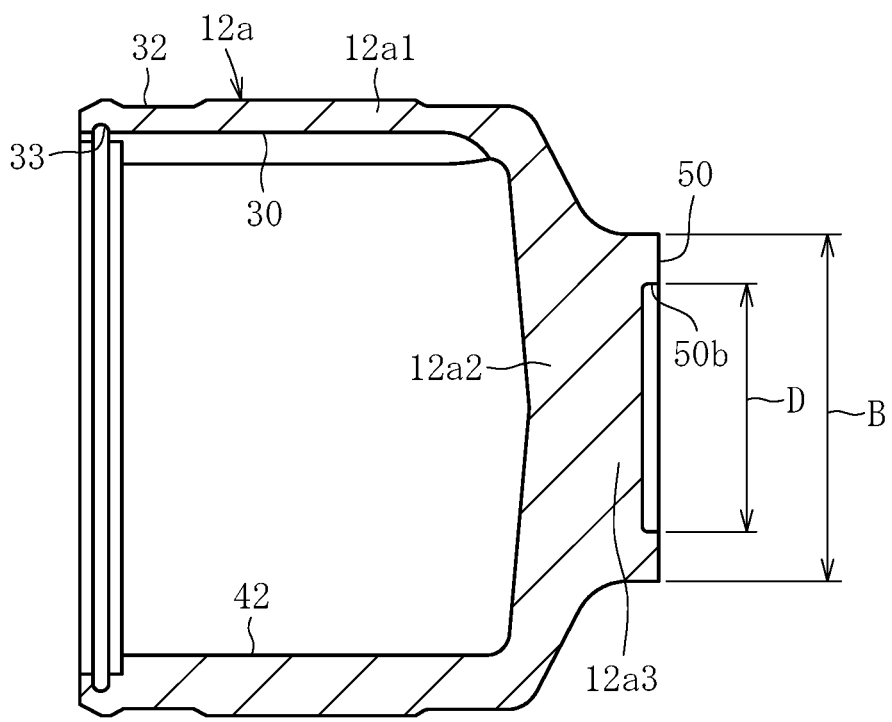
FIG. 4b is a vertical sectional view of the cup member after turning.

FIG. 4a is an illustration of a state after ironing of the cup member 12a. FIG. 4b is an illustration of a state after turning. In a preform for the cup member 12a, there are integrally formed a cylindrical portion 12a1', a bottom portion 12a2', and a short shaft section 12a3' in the forging step S2c. After that, the track grooves 30 and the cylindrical surface 42 are formed by ironing in the ironing step S3c so that the inner periphery of the cylindrical portion 12a1' is finished as illustrated in FIG. 4a. After that, in the turning step S4c, the outer peripheral surface, the boot mounting groove 32, the snap ring groove 33, and the like of the cup member 12a as well as the joining end surface 50 of the short shaft section 12a3 and the outer diameter B and the inner diameter D of the joining end surface 50 are formed by turning as illustrated in FIG. 4b.

Figure 5A:
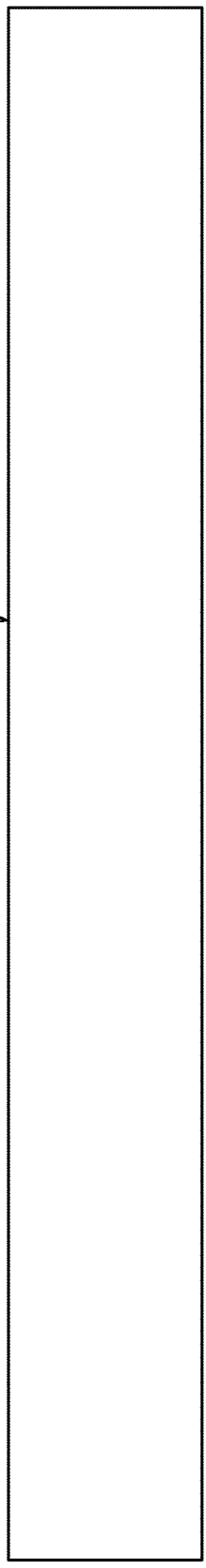
FIG. 5a is a front view of a bar material being a blank of a shaft member.
Figure 5B:
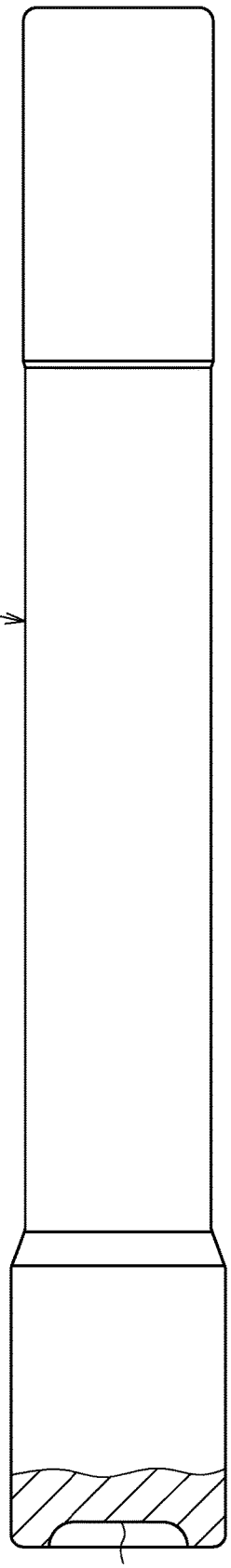
FIG. 5b is a partial sectional front view after forging.
Figure 5C:
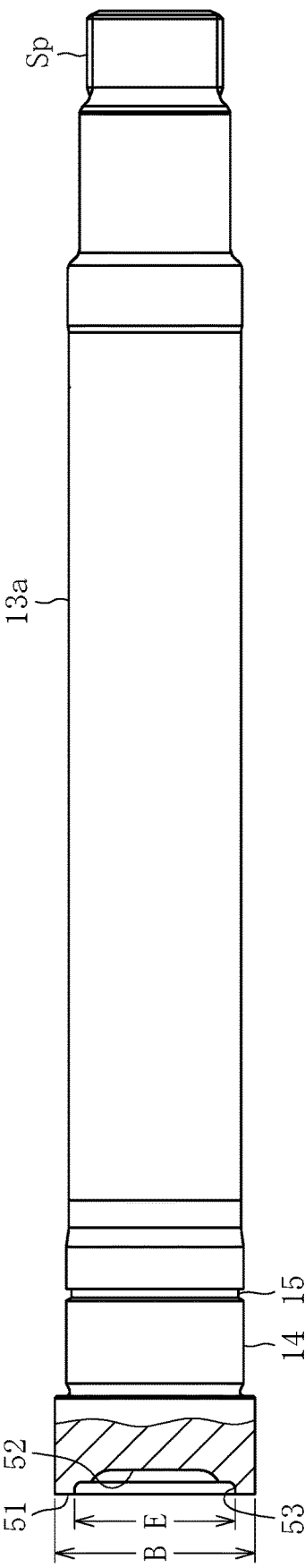
FIG. 5c is a partial sectional front view of the shaft member after turning and spline processing.

FIG. 5a to FIG. 5c are illustrations of states of the shaft member 13a in the respective processing steps. That is, FIG. 5a is an illustration of a billet 13a" obtained by cutting a bar material. FIG. 5b is an illustration of a preform 13a' obtained by forging the billet 13a" into a rough shape by upset forging. FIG. 5c is an illustration of the shaft member 13a after turning and spline processing.

The billet 13a" illustrated in FIG. 5a is formed in the bar material cutting step S1s. The preform 13a' is formed by increasing, if necessary, the shaft diameter of the billet 13a" in a predetermined range and forming a recess 52 at a joining-side end portion (end portion on the cup member 12a side) by upset forging as illustrated in FIG. 5b.

After that, in the turning step S2s, the outer diameter of the shaft member 13a, the bearing mounting surface 14, the snap ring groove 15, an inner diameter portion 53 (inner diameter E), the joining end surface 51, and the outer diameter B thereof are formed by turning, as illustrated in FIG. 5c. Further, in the spline processing step S3s, the spline shaft Sp is processed at the end portion on the opposite side to the recess 52 by rolling or press forming.

The outer diameter B of the joining end surface 50 of the cup member 12a illustrated in FIG. 4b is set to an equal dimension for one joint size. Further, in the shaft member 13a illustrated in FIG. 5c, which is used for a long stem shaft type, the outer diameter B of the joining end surface 51 located at the end portion on the cup member 12a side is set to an equal dimension to the outer diameter B of the joining end surface 50 of the cup member 12a irrespective of the shaft diameter and the outer peripheral shape. Still further, the joining end surface 51 of the shaft member 13a is located at the position on the cup member 12a side with respect to the bearing mounting surface 14.

Through the setting of dimensions as described above, the outer joint member 11 compatible with various vehicle types can be manufactured in such a manner that, while the cup member 12a is prepared for common use, only the shaft member 13a is manufactured to have a variety of shaft diameters, lengths, and outer peripheral shapes depending on vehicle types, and both the members 12a and 13a are welded to each other. Details of the preparation of the cup member 12a for common use are described later.

Figure 6:
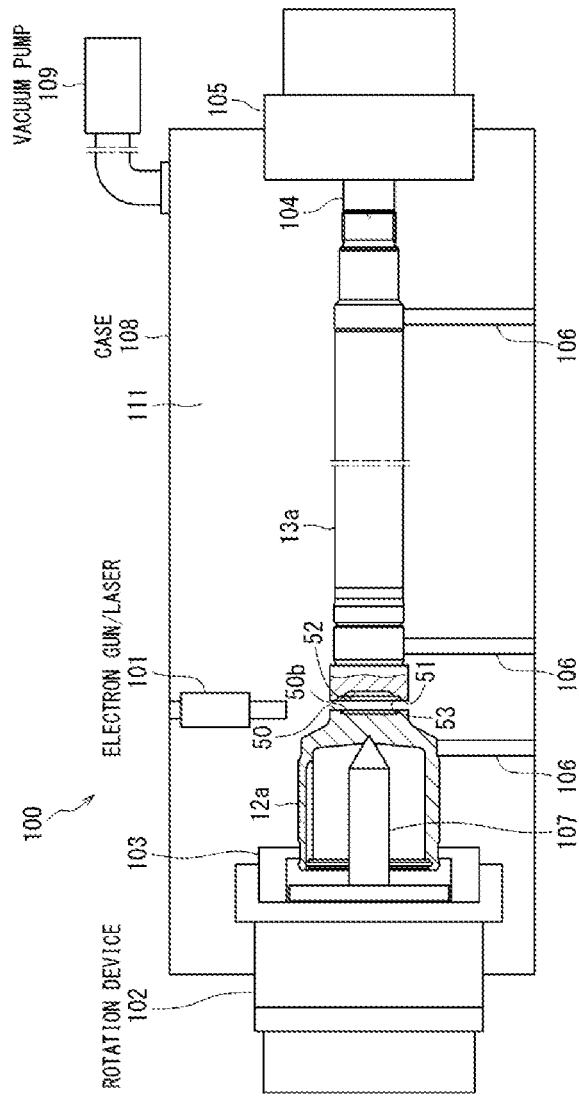
FIG. 6 is a schematic elevation view of a welding apparatus before welding.

Next, welding of the cup member 12a and the shaft member 13a is described with reference to FIG. 6 and FIG. 7. FIG. 6 is a schematic elevation view of a welding apparatus for illustrating a state before welding, and FIG. 7 is a schematic plan view of the welding apparatus for illustrating a state during welding.

As illustrated in FIG. 6, a welding apparatus 100 mainly comprises an electron gun 101, a rotation device 102, a chuck 103, a center 104, a tailstock 105, workpiece supports 106, a center 107, a case 108, and a vacuum pump 109.

The cup member 12a and the shaft member 13a being workpieces are placed on the workpiece supports 106 arranged inside the welding apparatus 100. The chuck 103 and the centering jig 107 arranged at one end of the welding apparatus 100 are coupled to the rotation device 102. The chuck 103 grips the cup member 12a to rotate the cup member 12a by the rotation device 102 under a state in which the center 107 has centered the cup member 12a. The center 104 is integrally mounted to the tailstock 105 arranged at another end of the welding apparatus 100. Both the center 104 and the tailstock 105 are configured to reciprocate in the axial direction (lateral direction of FIG. 6).

A center hole of the shaft member 13a is set on the center 104 so that the shaft member 13a is centered. The vacuum pump 109 is connected to the case 108 of the welding apparatus 100. A "sealed space" herein refers to a space 111 defined by the case 108. The cup member 12a and the shaft member 13a are entirely received in the sealed space 111. The electron gun 101 is arranged at a position corresponding to the joining end surfaces 50 and 51 of the cup member 12a and the shaft member 13a. The electron gun 101 is configured to be approachable to and separable from the workpieces.

The operation of the welding apparatus 100 constructed as described above and the welding method are described below.

The cup member 12a and the shaft member 13a being workpieces are stocked at a place different from the place of the welding apparatus 100. The respective workpieces are taken out by, for example, a robot, are conveyed into the case 108 of the welding apparatus 100 opened to the air as illustrated in FIG. 6, and are set at predetermined positions of the workpiece supports 106. At this time, the center 104 and the tailstock 105 are retreated to the right side of FIG. 6, and hence a gap is formed between the joining end surfaces 50 and 51 of the cup member 12a and the shaft member 13a.

After that, a door (not shown) of the case 108 is closed, and the vacuum pump 109 is activated to reduce the pressure in the sealed space 111 defined in the case 108. Thus, the pressures in the recessed portion 50b of the cup member 12a and the recess 52 of the shaft member 13a are reduced as well.

When the pressure in the sealed space 111 is reduced to a predetermined pressure, the center 104 and the tailstock 105 are advanced to the left side as illustrated in FIG. 7 to eliminate the gap between the joining end surfaces 50 and 51 of the cup member 12a and the shaft member 13a. Thus, the cup member 12a is centered by the center 107 and fixed by the chuck 103, whereas the shaft member 13a is centered and supported by the center 104. After that, the workpiece supports 106 are moved away from the workpieces (12a and 13a). At this time, the distance between the workpiece supports 106 and the workpieces (12a and 13a) may be infinitesimal, and hence illustration of this distance is omitted from FIG. 7. As a matter of course, the welding apparatus 100 may have such a structure that the workpiece supports 106 are retreated downward greatly.

Although illustration is omitted, the electron gun 101 is then caused to approach the workpieces (12a and 13a) up to a predetermined position, and the workpieces (12a and 13a) are rotated to start pre-heating. As a pre-heating condition, unlike the welding condition, the temperature is set lower than the welding temperature by, for example, radiating an electron beam under a state in which the beam size of the electron beam is larger than the beam size which is given during welding. Through the pre-heating, an input heat amount is increased. Thus, with the post-heating described later, the cooling rate at the welded portion after welding is reduced, thereby being capable of preventing a quenching crack.

When a predetermined pre-heating time has elapsed, the electron gun 101 is retreated to a predetermined position, and radiates the electron beam from the outer side of the workpieces (12a and 13a) in the radial direction to start welding. During one rotation of the workpieces (12a and 13a), welding is performed on an entire circumference, thereby forming the annular welded portion 49.

Post-heating is performed to reduce the cooling rate of the welded portion 49 and prevent quenching.

When the welding is finished, the electron gun 101 is retreated, and the rotation of the workpieces (12a and 13a) is stopped.

Although illustration is omitted, the sealed space 111 is then opened to the air. Then, the center 104 and the tailstock 105 are retreated to the right side in the drawing sheet and the chuck 103 is opened under a state in which the workpiece supports 106 are raised to support the workpieces. After that, for example, the robot grips the workpieces (12a and 13a), takes the workpieces out of the welding apparatus 100, and places the workpieces into alignment on a cooling stocker. In this embodiment, the cup member 12a and the shaft member 13a are entirely received in the sealed space 111, and hence the configuration of the sealed space 111 defined in the case 108 can be simplified.

Specific conditions for welding are exemplified below.

The cup member 12a having a carbon content of from 0.4 wt % to 0.6 wt % and the shaft member 13a having a carbon content of 0.3 wt % to 0.55 wt % were used and welded to each other in the welding apparatus 100 under the condition that the pressure in the sealed space 111 defined in the case 108 was set to 6.7 Pa or less. In order to prevent rapid cooling after the welding to suppress excessive increase in hardness of the welded portion, a periphery including the joining end surfaces 50 and 51 of the cup member 12a and the shaft member 13a were soaked by pre-heating with the electron beam to have a temperature of from 300° C. to 650° C., and then electron beam welding was performed. As a result, the pre-heating time was able to be reduced to approximately one-half or less as compared to the case where the recess is not formed on the radially inner side of the joining end surface, and a favorable welded portion satisfying the required strength was able to be obtained.

As a result, a welded portion having a projecting height from the welded surface (0.5 mm or less), which imposed no adverse effect on a product function, was obtained. Further, through the soaking by pre-heating, the hardness of the welded portion after completion of the welding was able to be kept within a range of from 200 HV to 500 HV, thereby being capable of attaining high welding strength and stable welding state and quality. Still further, welding was performed under the condition that the pressure in the sealed space 111 defined in the welding apparatus 100 was set to an atmospheric pressure or less, thereby being capable of suppressing the change in pressure in the recess 52 or the recessed portion 50b during the welding. As a result, the blowing of a molten material and the entry of the molten material toward the radially inner side were able to be prevented.

Figures 8A, 8B:
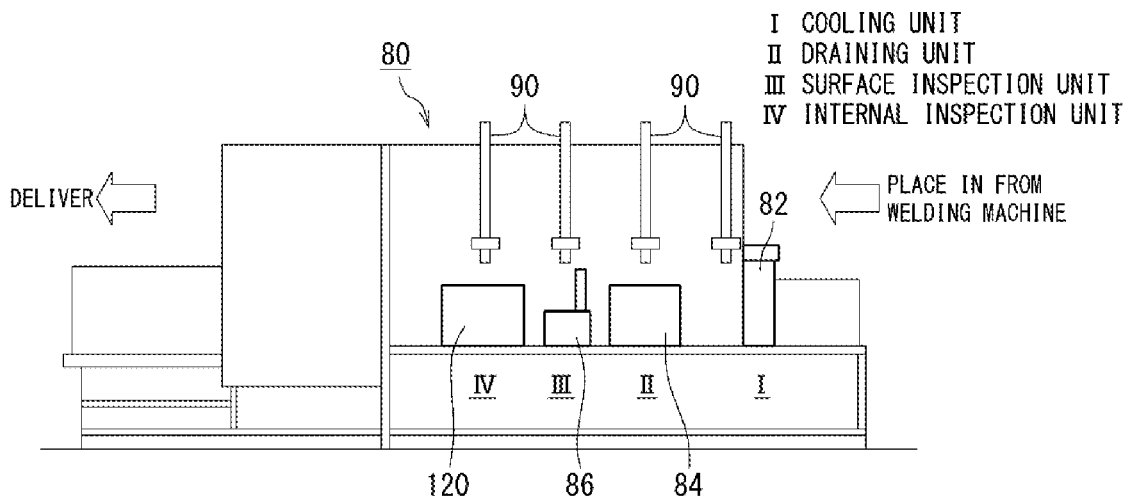
FIG. 8a is a schematic elevation view for illustrating an overall appearance of an inspection device.
FIG. 8b is a table for showing an overview of main inspection items.

The workpiece, that is, the joint-type outer joint member 11 after welding is delivered to an inspection device. With reference to FIG. 8a for illustrating a schematic configuration of the inspection device, inspection steps are described below. The orders of the inspection steps and arrangement of inspection units configured to perform the respective inspection steps are not limited to the illustrated example, and are arbitrary. Specific configurations of the inspection units can also be changed as appropriate in accordance with, for example, whether or not to use a rotary driver in common and other circumstances.

An inspection device 80 illustrated in FIG. 8a is entirely enclosed in a cage. In the cage, there are sequentially arranged a cooling unit I, a draining unit II, a surface inspection unit III, and an internal inspection unit IV from right to left in FIG. 8a. In the peripheries of the units I to IV, there are arranged robot hands 90 configured to deliver the workpiece W. Further, as indicated by the outlined arrows, the workpiece W after the welding step is first placed into the cooling unit I. After all the inspections are completed, the workpiece W is conveyed to the next step. When the workpiece W is determined as being defective as a result of the inspection, the workpiece W is removed from a line and collected to a predetermined location.

Although illustration is omitted, a contact-type gauge, a laser displacement meter, and an ultrasonic flaw detection device, which construct the inspection device 80, are electrically connected through intermediation of an interface to a control device arranged outside the cage. Typically, the control device corresponds to a base unit of the manufacturing line. Further, a recording unit is arranged in the control device. Thus, inspection results including inspection items and measured values related to each workpiece are recorded in association with a product number of the workpiece. Further, data in the recording unit can be displayed on a display arranged on an operation panel so that the inspection results can be confirmed also on site (see FIG. 10b and FIG. 11c).

The cooling unit I is a station configured to perform a cooling step. That is, a cooling water bath 82 is arranged, and the workpiece W at high temperature after welding is immersed in the cooling water bath 82 to be cooled. Typically, the workpiece W is cooled to a normal temperature so as not to hinder conveyance or operation in the next step.

The workpiece after the cooling step is delivered to the draining unit II. In the draining unit II, there is arranged a draining device 84. Air is blown to the workpiece taken out from the cooling water bath 82, thereby draining superfluous water.

The workpiece after the draining step is delivered to the surface inspection unit III. In the surface inspection unit III, measurement of a defect which appears on a surface of the workpiece, that is, deflection of the workpiece and detection of a pit on a bead surface of the welded portion 49 are performed. Both inspection and measurement need to be performed on an entire circumference of the workpiece while rotating the workpiece. Thus, the same rotary driver is used in common in the surface inspection unit III. However, as a matter of course, it may also be configured so that the pit detection and the deflection measurement are performed individually at different locations. When a servo motor having an encoder is employed as the rotary driver, a rotation angle and each measured value of the workpiece can advantageously be recorded in association with each other.

Figure 9:
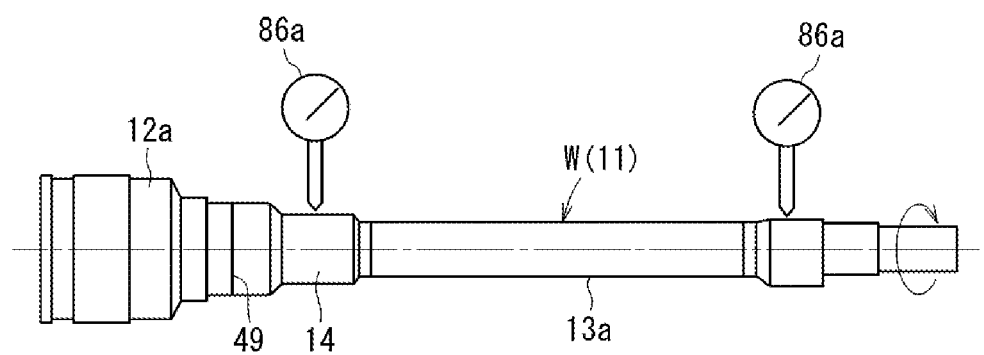
FIG. 9 is a schematic view for illustrating deflection measurement through use of contact-type displacement meters.

As illustrated in FIG. 8b (1) and FIG. 9, the deflection measurement is performed through use of a contact-type gauge 86a. In the embodiment, an electric dial gauge is used as the contact-type gauge 18a. Deflection is measured in the entire circumference of the workpiece W while rotating the workpiece W. The measured values are transmitted as an electric signal from the contact-type gauge 86a to the recording unit. In the recording unit, the measured values are recorded in association with the rotation of the workpiece W. Thus, a deflection diagram for 360° can be obtained. In the recording unit, the measured values of deflection are recorded in association with a product number of each workpiece W. Further, a maximum value of the measured values is compared with a preset upper limit value. When the maximum value exceeds the upper limit value, the workpiece W is determined as being defective.

With regard to measurement positions in the axial direction, the workpiece W is the outer joint member 11 of the long stem type and has a long length, and hence deflection is measured at a plurality of points, that is, at least at the cup member 12a and the shaft member 13a. Further, as illustrated in FIG. 9, when the shaft section 13 has ground-finished surfaces such as a bearing mounting surface 14 and so on, those surfaces can be used as surfaces to be measured.

Figure 10A:
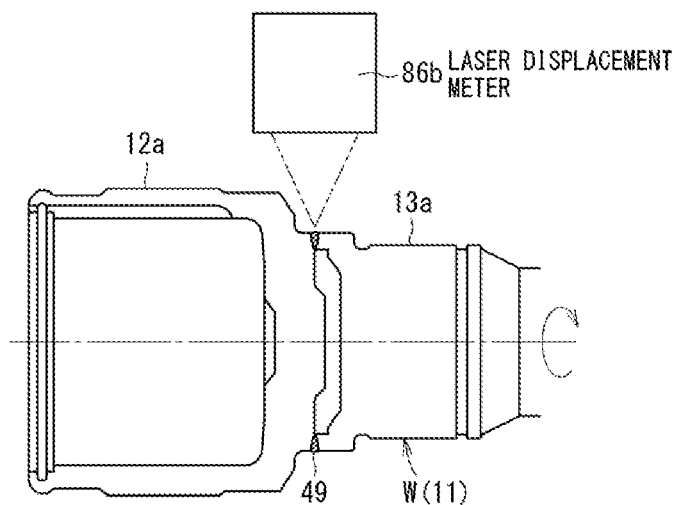
FIG. 10a is a schematic sectional view for illustrating an overview of visual inspection through use of a laser displacement meter.

As illustrated in FIG. 8b (2) and FIG. 10a, the detection of the pit is performed through use of a laser displacement meter 86b. For example, as is well known, a reflective type laser displacement meter comprises a light-projecting unit configured to project laser light to an object to be measured and a light-receiving unit configured to receive the laser light reflected from the object to be measured. Then, the laser light irradiated from the laser light-projecting unit is reflected from the object to be measured, and the reflected laser light is received by the laser light-receiving unit. Then, a spot is connected on the laser light-receiving unit. As the object moves, the spot also moves. Thus, through detection of a position of the spot, the amount of displacement with respect to the object is detected. Herein, the laser light is irradiated to the welded portion 49 while rotating the workpiece W. Thus, the presence or absence of the pit is detected in a contactless manner, and a depth thereof is measured.

Figure 10B:
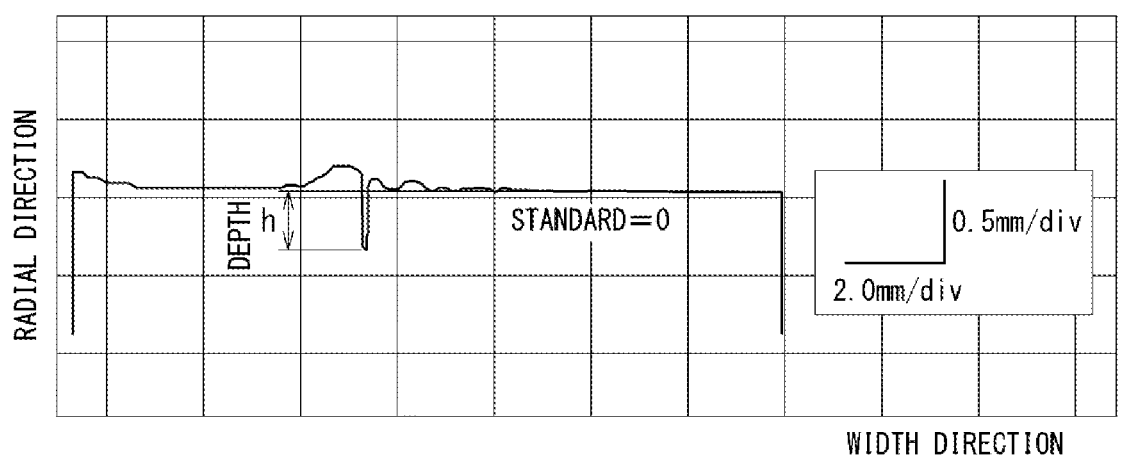
FIG. 10b is a graph for showing an example of an inspection result.

FIG. 10b is an illustration of an image on a display on the operation panel in a case where a pit having a depth h of about 0.4 mm is detected. The horizontal axis of FIG. 10b represents a width direction of the bead of the welded portion 49, and the vertical axis represents the radial direction of the welded portion 49. The measurement results of the laser displacement meter 86b are transmitted as an electric signal from the laser displacement meter 86b to the recording unit. In the recording unit, a maximum value of the depth h for one rotation of the workpiece is recorded in association with a product number of each workpiece W. Further, the measured values of the depth h are compared with a preset upper limit value. When the measured value exceeds the upper limit value, the workpiece W is determined as being defective.

The workpiece after the deflection measurement and the pit detecting step is delivered to the internal inspection unit IV. In the internal inspection unit IV, as illustrated in FIG. 11, the ultrasonic flaw detection device is used to perform detection of an internal defect of the welded portion 49, that is, poor penetration of the welded portion 49 (see FIG. 8b (3)) and detection of a blowhole and a weld crack (see FIG. 8b (4)). As indicated by the two-dot chain line in FIG. 11a, a probe 147 of an ultrasonic flaw detection device 120 scans in the axial direction to detect the poor penetration, the blowhole, and the weld crack based on an echo height of a reflected echo with respect to an incident pulse G from the probe 147. FIG. 11b is an illustration of echo level data (criterion) for a circumference of the welding position. FIG. 11c is an illustration of an example in a case where the echo level does not meet the criterion. The ultrasonic flaw detection through use of the ultrasonic flaw detection device 120 is described further in detail later. Measurement results of the ultrasonic flaw detection device 120 are transmitted as an electric signal to the recording unit. In the recording unit, the presence or absence of defects such as the poor penetration, the blowhole, and the weld crack, as well as, in the case where the defect is detected, a position of the defect in the axial direction and in the circumferential direction are recorded in association with a product number of each workpiece W. Further, when those defects are detected, the workpiece W is determined as being defective.

In the welding step which is a step prior to inspection, observation ranges are set for the degree of vacuum and pre-heating and post-heating conditions of welding, and confirmation is made for processing under appropriate conditions. Then, the fact is recorded in the recording unit of the inspection device 80. At that time, as a series of lines, the processing conditions and inspection results are recorded in association with a product number of each workpiece, to thereby secure traceability. Further, the product number of the workpiece may include, in addition to a type of welding, identification of a base material (cup member and shaft member), confirmation of a welding position, confirmation of an outline and a member of nondestructive examination, and confirmation of a position to be corrected as appropriate.

FIG. 12 is an illustration of a table related to records, such as inspection results, and a storage for data. The circles in the columns of "CONTENTS TO BE RECORDED" indicate that the corresponding items are to be recorded. That is, in the column of "ITEMS", "SUBJECT MODEL NUMBER" represents a product number of a workpiece, and a record is given in the "SET VALUE" column. With regard to "INSPECTION COMPLETION TIME", an actual time is recorded in the "ACTUAL MEASURED VALUE" column. With regard to "PIT", an upper limit and a lower limit are recorded in the "SET VALUE" column, and records are given to "ACTUAL MEASURED VALUE" and "DETERMINATION RESULT". With regard to the "POOR PENETRATION" column, a record is given to "DETERMINATION RESULT". With regard to "DEGREE OF VACUUM•WELDING CONDITION", an upper limit and a lower limit are recorded in "SET VALUE", and records are given to "ACTUAL MEASURED VALUE" and "DETERMINATION RESULT". With regard to "DEFLECTION MEASUREMENT", an upper limit is recorded in "SET VALUE" for each of "CUP SIDE" and "STEM SIDE", and records are given to "ACTUAL MEASURED VALUE" and "DETERMINATION RESULT". With regard to "INTERNAL DEFECT (DETAILED FLAW DETECTION DATA)", records related to internal defects of the welded portion, that is, the blowhole and the weld crack, which are obtained as inspection results of the ultrasonic flaw detection, are given to "SET VALUE", "ACTUAL MEASURED VALUE", and "DETERMINATION RESULT". The "STORAGE" column represents locations for recording data of each item. That is, an example is given in which all pieces of data related to the inspection are basically recorded in the recording unit of a line base unit, and detailed data of the ultrasonic flaw detection is recorded also in the ultrasonic flaw detection device.

Next, the ultrasonic flaw detection step is described with reference to FIG. 13 to FIG. 18.

Figure 13:
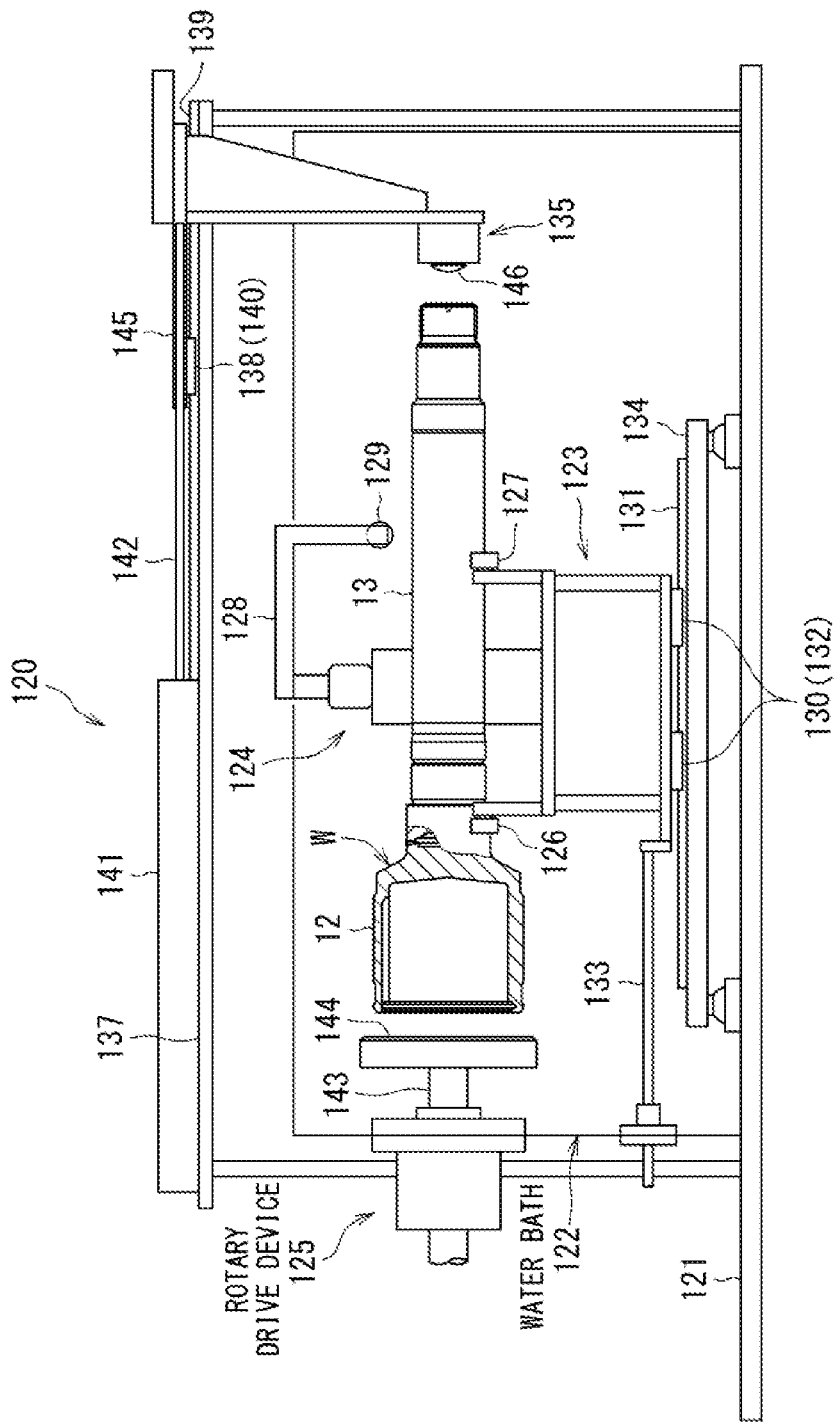
FIG. 13 is a schematic elevation view of the ultrasonic flaw-detection apparatus.
Figure 14:
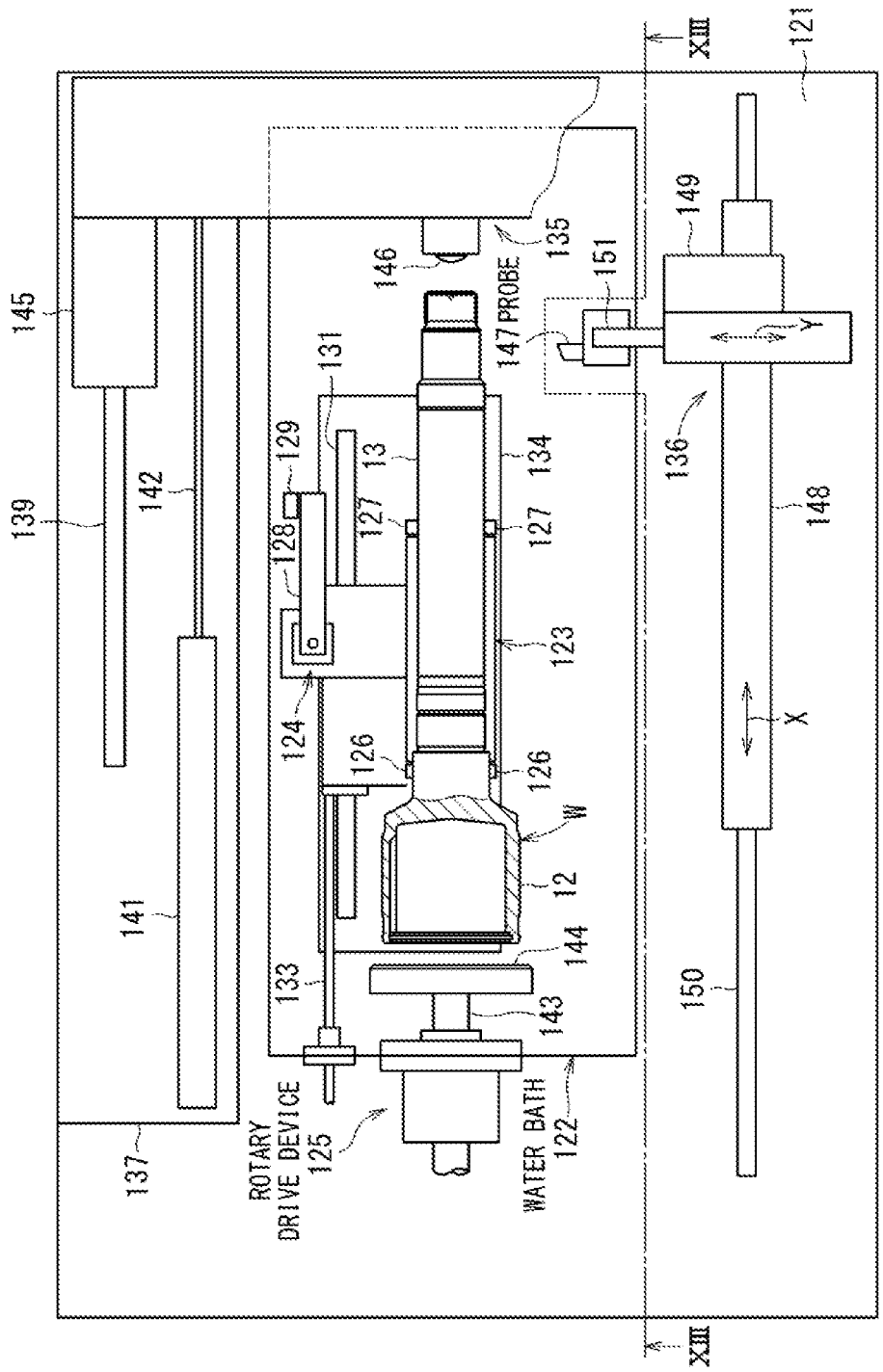
FIG. 14 is a schematic plan view of the ultrasonic flaw-detection apparatus.

Herein, FIG. 13 and FIG. 14 are a front view and a plan view, respectively, of an ultrasonic flaw-detection apparatus having a welded outer joint member mounted thereto. FIG.

Figure 15:
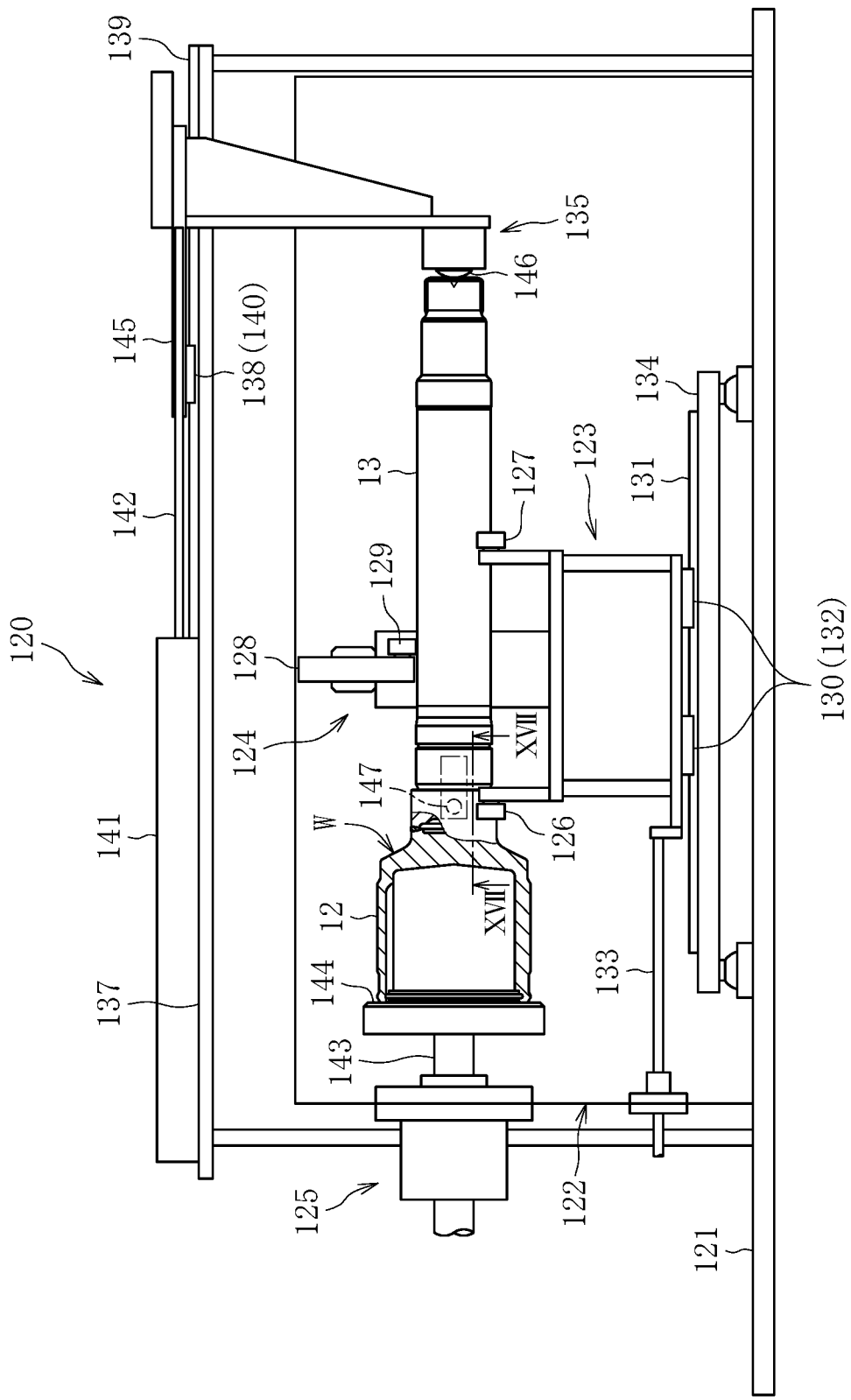
FIG. 15 is a schematic elevation view of the ultrasonic flaw-detection apparatus.
Figure 16:
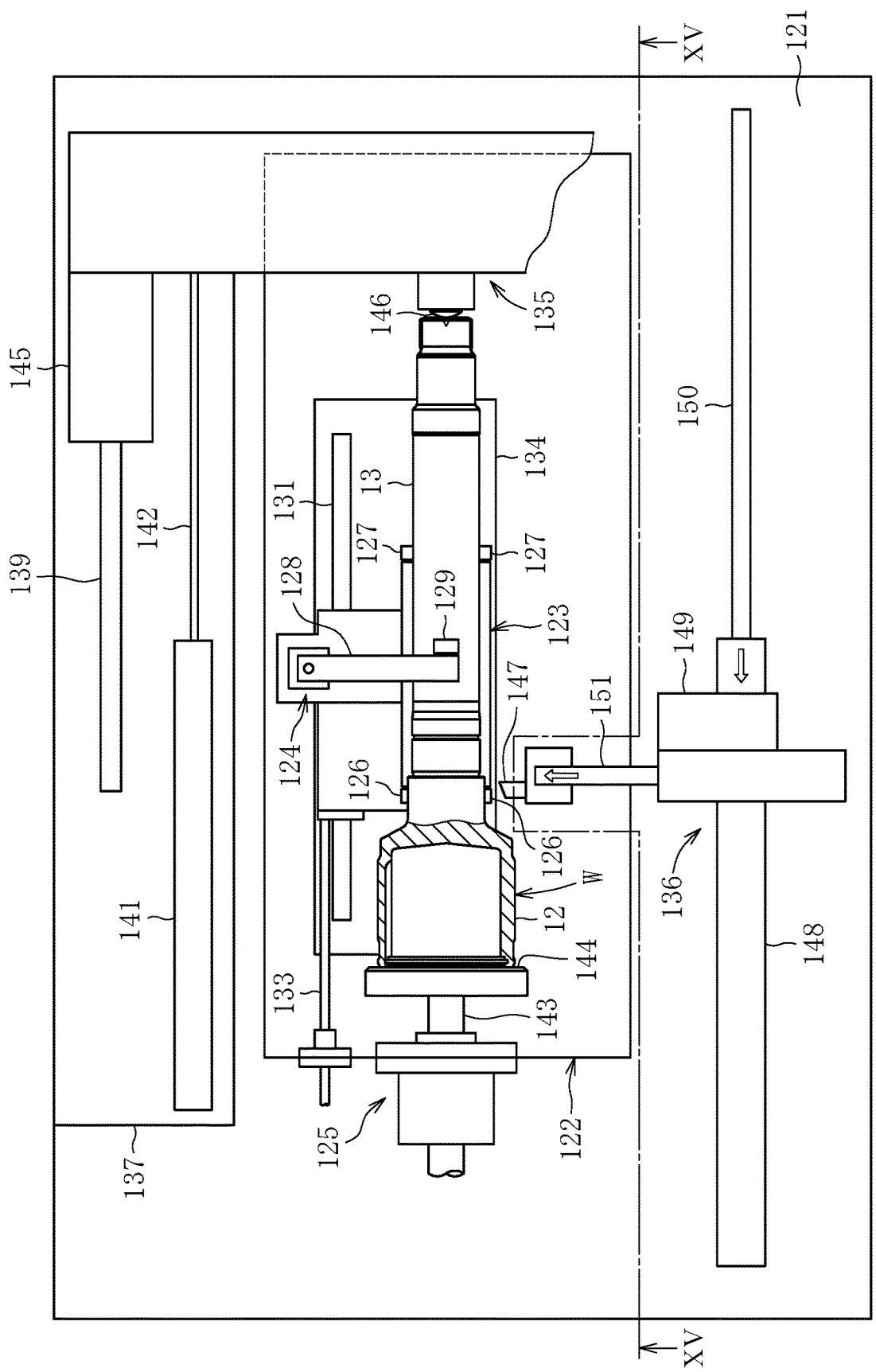
FIG. 16 is a schematic plan view of the ultrasonic flaw-detection apparatus.

13 corresponds to an illustration as viewed from the direction of the arrow XIII-XIII of FIG. 14. FIG. 15 and FIG. 16 are a front view and a plan view, respectively, of the ultrasonic flaw-detection apparatus during the ultrasonic flaw detection. FIG. 15 corresponds to an illustration as viewed from the direction of the arrow XV-XV of FIG. 16.

As illustrated in FIG. 13 and FIG. 14, an ultrasonic flaw-detection apparatus 120 mainly comprises a base 121, a water bath 122, a workpiece support 123, a workpiece holding member 124, a rotary drive device 125, a pressing device 135, and a drive positioning device 136 (see FIG. 14). The water bath 122 is mounted at the center of the base 121. The rotary drive device 125 is configured to rotate the workpiece W, that is, the outer joint member 11 after being subjected to welding. The pressing device 135 is configured to press an axial end of the workpiece W. The drive positioning device 136 is configured to drive and position a probe 147.

The workpiece support 123 comprises support rollers 126 and 127 configured to allow the workpiece W to be placed thereon in a freely rotatable manner. The support rollers 126 are arranged at a position close to the welded portion. The support rollers 127 are arranged near a center portion of the shaft section 13. As is apparent from FIG. 14, the support rollers 126 and 127 are constructed by pairs of rollers provided on both sides in the axial line of the shaft section 13 so that the shaft section 13 of the workpiece W can be stably supported. The support rollers 126 and 127 are capable of adjusting the placement position of the workpiece W in the axial direction (lateral direction of FIG. 13) and the radial direction (vertical direction of FIG. 13) in consideration of a joint size, dimensions, and weight balance of the workpiece W.

Further, the workpiece holding member 124 is mounted to the workpiece support 123 at a position displaced in a plane of FIG. 14 from an axial line of the workpiece W. The workpiece holding member 124 comprises a lever 128, and a workpiece holding roller 129 is arranged at an end portion of the lever 128. The lever 128 is pivotable in the plane of FIG. 14, and is movable in the vertical direction of FIG. 13.

The workpiece support 123 is mounted to a support 134 through intermediation of a linear-motion bearing 130 comprising rails 131 and linear guides 132, and is movable in the axial direction (lateral direction of FIG. 13 and FIG. 14). The support 134 is mounted to the base 121. The workpiece support 123 can be driven to be positioned at a desired position by an actuator (not shown) arranged on an outside of the water bath 122 through intermediation of a rod 133 coupled to an end portion (left end portion of FIG. 13 and FIG. 14).

The rotary drive device 125 comprises a rotary shaft 143 having a rotary disc 144 mounted thereto, and this rotary shaft 143 is driven to rotate by a motor (not shown) arranged on the outside of the water bath 122.

A mounting base 137 is arranged on an upper side of the ultrasonic flaw-detection apparatus 120. A base plate 145 for the pressing device 135 is mounted to the mounting base 137 through intermediation of a linear-motion bearing 138 comprising a rail 139 and a linear guide 140 so that the base plate 145 of the pressing device 135 is movable in the axial direction (lateral direction of FIG. 13 and FIG. 14). A rod 142 of a pneumatic cylinder 141 is coupled to an end portion of the base plate 145 so that the base plate 145 is driven, that is, axially moved by the pneumatic cylinder 141. The pressing device 135 is held in abutment against the axial end of the shaft section 13 of the workpiece W through a free bearing 146.

As viewed in the plane of FIG. 14, the drive device 136 for a probe is arranged at a position displaced in the axial line of the workpiece W. This drive device 136 comprises actuators for the X-axis direction and the Y-axis direction so that a probe 147 is driven to be positioned in the X-axis direction and the Y-axis direction. An actuator 148 for the X-axis direction and an actuator 149 for the Y-axis direction are each an electric ball-screw type (ROBO cylinder), which is capable of performing positioning with high accuracy. The reference symbol 150 denotes a rail for a linear-motion bearing. The drive device 136 is arranged on the outside of the water bath 122, and the probe 147 and a holder 151 therefor are arranged in the water bath 122.

Next, the operation of the ultrasonic flaw-detection apparatus 120 having the above-mentioned configuration and the ultrasonic flaw detection step S6k are described below.

First, the workpiece W after welding is placed on the workpiece support 123 by a loader (not shown) (see FIG. 13 and FIG. 14). At this time, the workpiece support 123 is located at an appropriate interval from the rotary drive device 125 in the axial direction of the workpiece W, and the workpiece holding member 124 raises and pivots the lever 128 thereof so as to be substantially parallel to the axial line of the workpiece W. Further, the pressing device 135 and the drive device 136 for a probe wait at retreated positions.

After that, the lever 128 of the workpiece holding member 124 is pivoted so as to be substantially perpendicular to the axial line of the workpiece W, and then lowered to hold the workpiece W from above (see FIG. 15). Then, water is supplied to the water bath 122. As described above, the ultrasonic flaw-detection apparatus 120 has the configuration of performing flaw detection under water, and hence ultrasonic waves are satisfactorily propagated. Thus, inspection can be performed with high accuracy.

Next, as illustrated in FIG. 15 and FIG. 16, the pneumatic cylinder 141 is driven to cause the pressing device 135 to be advanced and pressed against the axial end of the workpiece W, thereby pressing the opening rim of the cup section 12 of the workpiece W against the rotary disc 144 of the rotary drive device 125. In conjunction with the advance of the pressing device 135, the workpiece support 123 is also moved toward the rotary drive device 125. Thus, the workpiece W is positioned in the axial direction and the radial direction. In this state, the motor (not shown) of the rotary drive device 125 is activated, thereby rotating the workpiece W.

As illustrated in FIG. 16 with the outlined arrow, the drive device 136 is moved in the X-axis direction, and then moved in the Y-axis direction, thereby positioning the probe 147 at a flaw detection position. The probe 147 in this state is indicated by the broken line in FIG. 15. Then, the ultrasonic flaw detection is performed. After the completion of the ultrasonic flaw detection, water is drained from the water bath 122, and the workpiece W is delivered from the ultrasonic flaw-detection apparatus 120 by the loader (not shown). In such a manner, the ultrasonic flaw detection is sequentially repeated on the workpiece W.

In order to reduce the cycle time of the ultrasonic flaw detection, it is desired that time-consuming supply and drainage of water be performed simultaneously with operations of the devices and the members, or at other timings in accordance therewith. Further, some of the operations of the devices and the members may be performed simultaneously with each other or in different orders as appropriate.

Figure 17B:
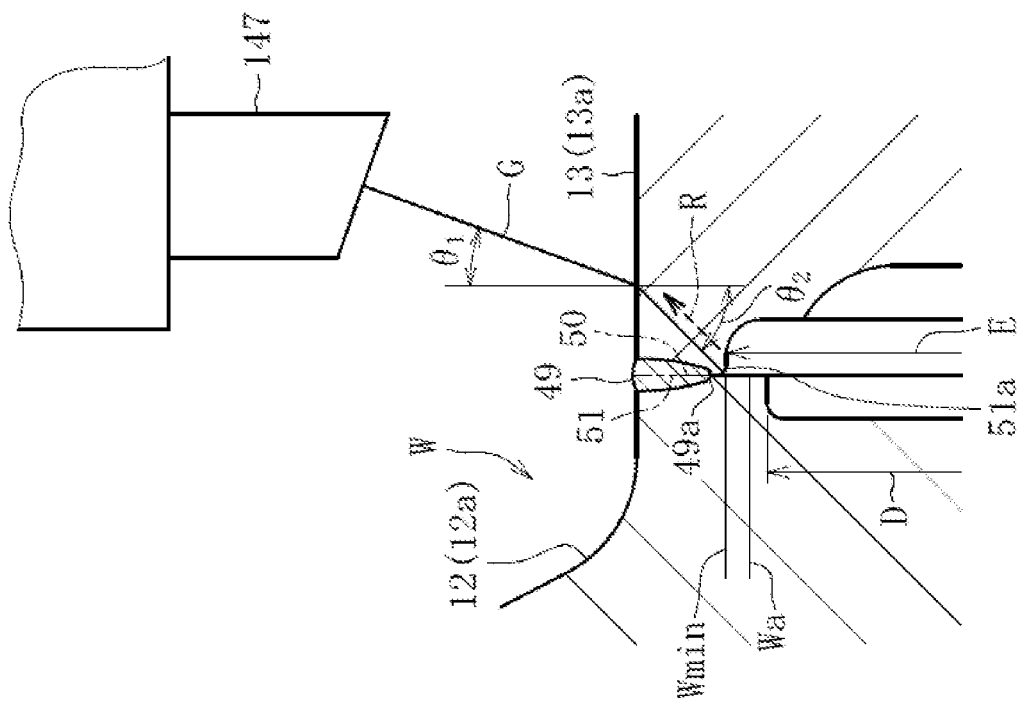
FIG. 17b is a partial enlarged sectional view of a defective welded product, which is taken along the line XVII-XVII of FIG. 15.
Figure 17A:
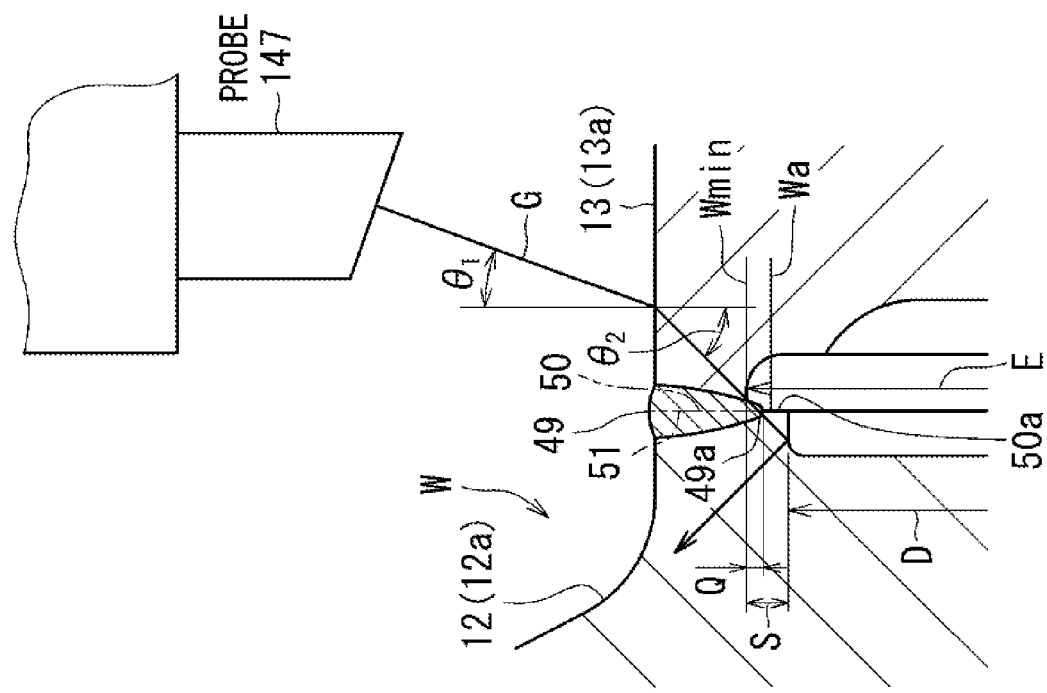
FIG. 17a is a partial enlarged sectional view of a non-defective welded product, which is taken along the line XVII-XVII of FIG. 15.
Figure 18:
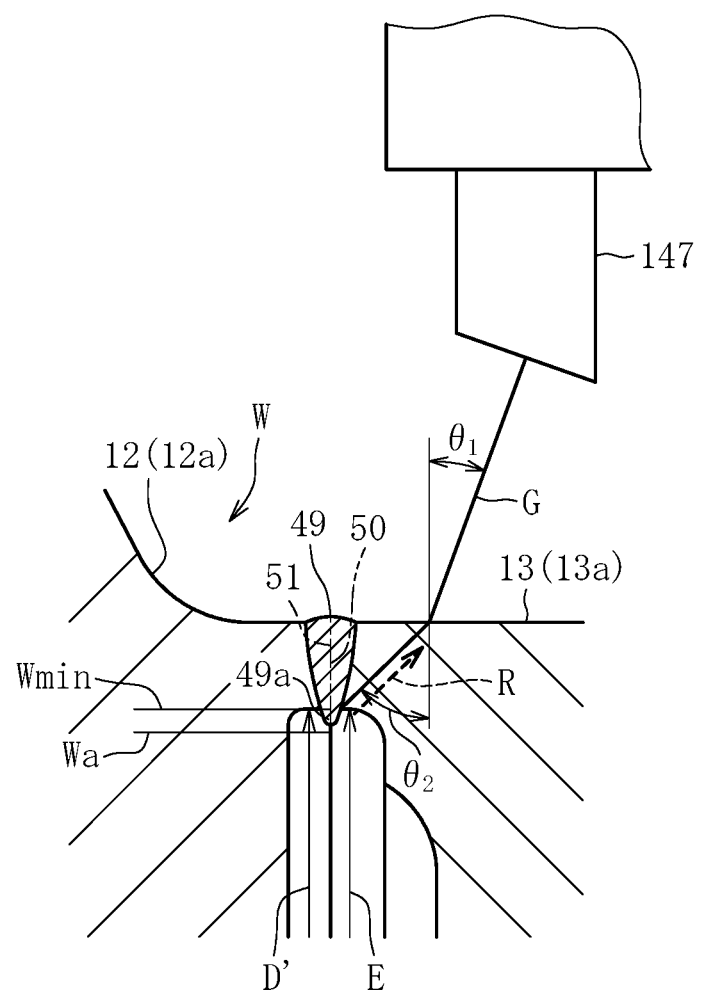
FIG. 18 is a partial enlarged sectional view, which is similar to FIG. 17a and FIG. 17b, for illustrating findings in the course of development.

Details of the ultrasonic flaw detection are described with reference to FIG. 17a, FIG. 17b, and FIG. 18. All of FIG. 17a, FIG. 17b, and FIG. 18 are views as viewed from the arrow XVII-XVII of FIG. 15. FIG. 17a is an illustration of a non-defective welded product. FIG. 17b is an illustration of a defective welded product. FIG. 18 is a view for illustrating findings in the course of development.

The probe 147 is positioned at a flaw detection position away from the welded portion 49 by a predetermined distance. The flaw detection position is preset for each joint size. A transmission pulse G from the probe 147 is caused to obliquely enter from a surface of the workpiece W. A reflected echo having been received is displayed as waveforms, and the waveforms may be observed to determine a presence or absence of defectiveness (angle beam flaw detection method). The reference symbol θ1 denotes an incident angle, and the reference symbol θ2 denotes a refraction angle. In the case of the embodiment, the incident angle θ1 is from 0° to 30°, and the refraction angle θ2 is from 0° to 90°. Appropriate angles can be selected for the incident angle θ1 and the refraction angle θ2 in accordance with a position and a shape of an object to be inspected.

As described above, the ultrasonic flaw detection device 120 is used to perform the inspection of poor penetration (see FIG. 8b (3)) and inspection of the blowhole and the weld crack (see FIG. 8b (4)). However, the inspection of the latter is the same as the typical ultrasonic flaw detection for a welded portion. Thus, herein, description is made mainly on the inspection of the former.

The presence or absence of the poor penetration in the welded portion 49 is determined based on the penetration depth. That is, workpieces having a penetration depth equal to or larger than a determination reference Wmin to reach a radially inner side are determined as non-defective welded products, and workpieces having a penetration depth smaller than the determination reference Wmin to terminate on a radially outer side are determined as defective welded products. In the illustrated example, the inner diameter portion 53 of the recess 52 formed in the joining end surface 51 is matched with the determination reference Wmin. The reference symbol E denotes an inner diameter of (the inner diameter portion 53 of) the recess 52, and also denotes an inner diameter of the joining end surface 51. The reference symbol Wa denotes a target penetration depth. Incidentally, after the welding, the welded portion 49 is formed on the radially outer side of the recess 52. As a result, a closed cavity is formed on the radially inner side of the welded portion 49. Thus, a back bead 49a *cannot be visually confirmed from outside*.

During the ultrasonic flaw detection, the workpiece W is driven by the rotary drive device 125 to rotate. The probe 147 positioned at the flaw detection position away from the welded portion 49 by the predetermined distance collects data of the entire periphery of the workpiece W. In consideration of tolerance for displacement of the welding position, at the above-mentioned flaw detection position, first, data of a single rotation (360°) of the workpiece W is collected. Then, the probe 147 is sequentially shifted in the axial direction at a minute pitch (for example, 0.5 mm) to collect data of a plurality of rotations (for example, five rotations). Based on those pieces of data, non-defective/defective determination is made. A threshold of a reflected echo to be used in the non-defective/defective determination is determined based on a welding pattern corresponding to the determination reference Wmin.

As already described above, in the joining end surface 50 of the cup member 12a, there is formed the protruding surface 50a which protrudes toward the radially inner side with respect to the inner diameter E of the joining end surface 51 of the shaft member 13a. With the above-mentioned shape, the following advantages in the ultrasonic flaw detection can be obtained.

For easy understanding of the above-mentioned advantages, description is preferentially made of findings in the course of development, that is, the case in which an inner diameter D' of the joining end surface 50 of the cup member 12a is set to an equal dimension to the inner diameter E of the joining end surface 51 of the shaft member 13a as illustrated in FIG. 18. In this case, the penetration depth is equal to or larger than the determination reference Wmin to reach the radially inner side, and hence the workpiece is to be determined as a non-defective welded product. However, when the transmission pulse G enters from the probe 147, due to the boundary surface of the back bead 49a, which is perpendicular to the transmission pulse G, a reflected echo R reflected by this boundary surface is received by the probe 147. Although reflected echoes from the back bead 49a are scattered, the reflected echo R has a large echo height exceeding the threshold of the reflected echo for the non-defective/defective determination. Thus, determination that the welded product is defective is made. For this reason, it was proved that the determination as to whether the welded product was non-defective or defective was difficult.

Thus, in the embodiment, a measure is taken by forming the protruding surface 50a, which protrudes toward the radially inner side with respect to the inner diameter E of the joining end surface 51 of the shaft member 13a, in the joining end surface 50 of the cup member 12a.

As illustrated in FIG. 17a, the non-defective welded product has sufficient penetration. In this case, the transmission pulse G from the probe 147 enters the cup section 12 through the back bead 49a having reached the radially inner side beyond the determination reference Wmin, and travels straight as it is. Alternatively, the transmission pulse G travels to the cup section 12 side by being reflected due to the inner diameter D of the cup section 12. Therefore, the probe 147 does not receive a reflected echo. That is, even when the transmission pulse G enters the back bead 49a, the boundary surface of the back bead 49a, which is perpendicular to the transmission pulse G, does not exist. Therefore, although a slightly-scattered reflected echo is generated, the reflected echo which may cause the detection error is not generated. Thus, the echo height of the reflected echo received by the probe 147 is equal to or less than the threshold, and hence determination that the welded product is non-defective is made.

As described above, when the protruding surface 50a is formed on the joining end surface 50 of the cup member 12a, the echo height of the reflected echo becomes lower. Thus, the accuracy in the inspection can be enhanced.

In the case of the defective welded product, as illustrated in FIG. 17b, a distal end of the bead 49a does not reach the determination reference Wmin due to the defective penetration. Thus, the transmission pulse G is reflected by the joining end surface 51 and a chamfered portion 51a, and the scattered reflected echo R is received by the probe 147. The reflected echo R exceeds the threshold of the reflected echo for the non-defective/defective determination, and hence determination that the welded product is defective is made.

As described above, the protruding surface 50a is formed on the joining end surface 50, and hence the echo heights of the reflected echoes can be clearly discriminated from each other. Thus, the determination as to whether the welded product is non-defective or defective can be made with high accuracy.

Dimensions of the protruding surface 50a are set so that a relationship of S≥Q is established, where S [S=(E−D)/2] is a width of the protruding surface 50a in a radial direction, and where Q is a height of the back bead 49a from the inner diameter E of the joining end surface 51 as illustrated in FIG. 17a. When this relationship is satisfied, the heights of the reflected echoes can be clearly discriminated from each other. Thus, the determination as to whether the welded product is non-defective or defective can be made with high accuracy. As long as the relationship of S≥Q is maintained, the dimensions of the protruding surface 50a may be set as appropriate. The inner diameter E of the joining end surface 51 is also an inner diameter (of the inner diameter portion 53) of the recess 52.

In the ultrasonic flaw-detection apparatus 120, the operation of loading the workpiece W, the supply and drainage of water, the ultrasonic flaw detection, and the operation of unloading the workpiece can be performed in conjunction with each other, and the ultrasonic flaw detection can be automated. Thus, accuracy, operability, and efficiency in the inspection can be enhanced, which is suited to the inspection on the welded portion of the outer joint member of the constant velocity universal joint being a mass-produced product.

Further, in the ultrasonic flaw detection, with the base configuration in which the outer diameter B of the joining end surface 50 of the cup member 12a is set to an equal dimension for each joint size, setup and replacement operations with respect to the outer joint members 11 having the different product numbers are reduced. Thus, the efficiency in the inspection can be further enhanced.

Still further, flaw detection is performed under water, and hence ultrasonic waves are satisfactorily propagated. Thus, inspection can be performed with much higher accuracy. In addition, through employment of the shape of the welded portion, in which the protruding surface 50a is formed on the joining end surface 50, the echo heights of the reflected echoes can clearly be discriminated from each other. Thus, the determination as to whether the welded product is non-defective or defective can be made with high accuracy.

Next, standardization of a product type of the cup member is additionally described while exemplifying a shaft member having a product number different from that of the above-mentioned shaft member 13a of the long stem type illustrated in FIG. 5.

Figure 19:
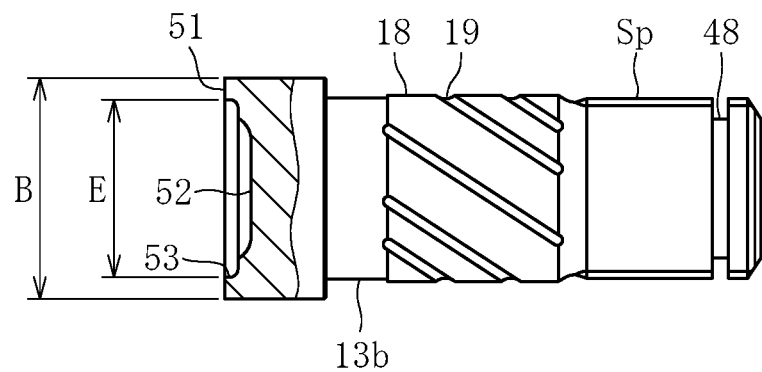
FIG. 19 is a partial sectional front view for illustrating a shaft member assigned with a different product number.
Figure 20:
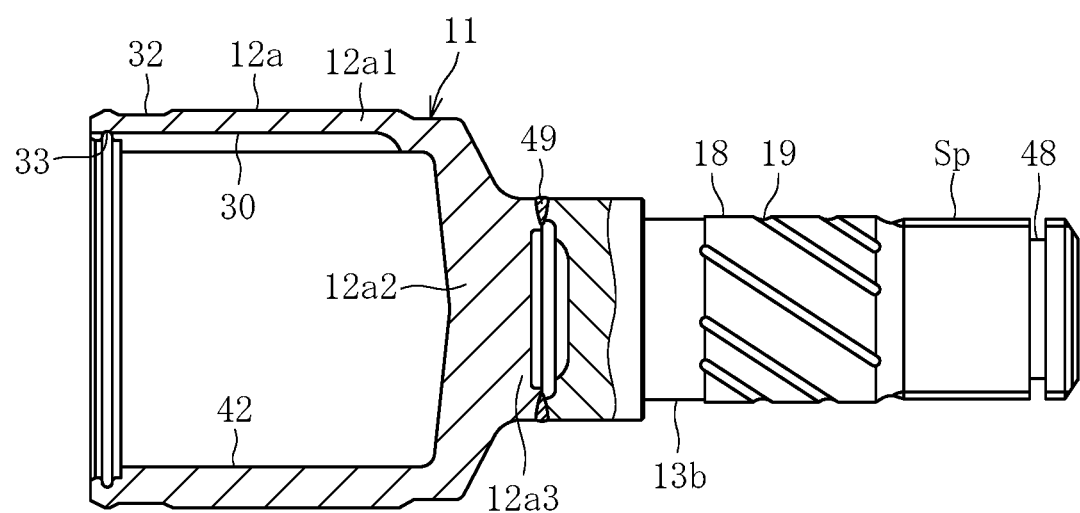
FIG. 20 is a partial sectional front view of an outer joint member that is manufactured using the shaft member of FIG. 19.

A shaft member 13b illustrated in FIG. 19 and FIG. 20 is used as a general stem type on the inboard side. The shaft member 13b has the joining end surface 51 to be brought into abutment against the joining end surface 50 (see FIG. 4b) of the bottom portion 12a2 (short shaft section 12a3) of the cup member 12a. The outer diameter B and the inner diameter E of the joining end surface 51 are set to the equal dimensions to the outer diameter B and the inner diameter E of the joining end surface 51 of the shaft member 13a of the long stem type illustrated in FIG. 5.

Also in this case, the inner diameter D of the joining end surface 50 of the cup member 12a is set smaller than the inner diameter E of the joining end surface 51 of the shaft member 13b. As a result, on the joining end surface 50 of the cup member 12a, the protruding surface 50a protruding to the radially inner side with respect to the inner diameter E of the joining end surface 51 of the shaft member 13b is formed. The joining end surfaces 50 and 51 having such shape are brought into abutment against each other to be welded so that the cup member 12a and the shaft member 13b are joined to each other.

The shaft member 13b is used as the general stem type on the inboard side. Accordingly, the shaft member 13b comprises a shaft section with a small length, and a sliding bearing surface 18 formed on an axial center portion thereof, and a plurality of oil grooves 19 are formed in the sliding bearing surface 18. The spline shaft Sp and the snap ring groove 48 are formed in an end portion on the side opposite to the cup member 12a side. As described above, even when there are differences in types, such as the general length stem type and the long stem type, and shaft diameters and outer peripheral shapes vary in each vehicle type, the outer diameter B of the joining end surface 51 of the shaft member 13a or 13b is set to an equal dimension.

The outer diameter B of the joining end surface 50 of the cup member 12a and the joining end surface 51 of the shaft member 13a or 13b is set to an equal dimension for each joint size. Thus, the cup member prepared for common use for each joint size, and the shaft member having a variety of specifications of the shaft section for each vehicle type can be prepared in a state before heat treatment. Further, the intermediate component of each of the cup member 12a and the shaft member 13a or 13b can be assigned with a product number for management. Even when standardizing product types of the cup member 12a, various types of the outer joint members satisfying requirements can be produced quickly through combination of the cup member 12a and the shaft member 13a or 13b having a variety of specifications of the shaft section for each vehicle type. Therefore, standardization of a product type of the cup member 12a can reduce cost and alleviate a burden of production management.

The standardization of the product type of the cup member is described above by taking the differences in types, such as the general length stem type and the long stem type, as an example for easy understanding, but the present invention is not limited thereto. The same applies to standardization of the product type of the cup member for shaft members having a variety of specifications of the shaft section for each vehicle type among the general length stem types, and for shaft members having a variety of specifications of the shaft section for each vehicle type among the long stem types.

Figure 21:
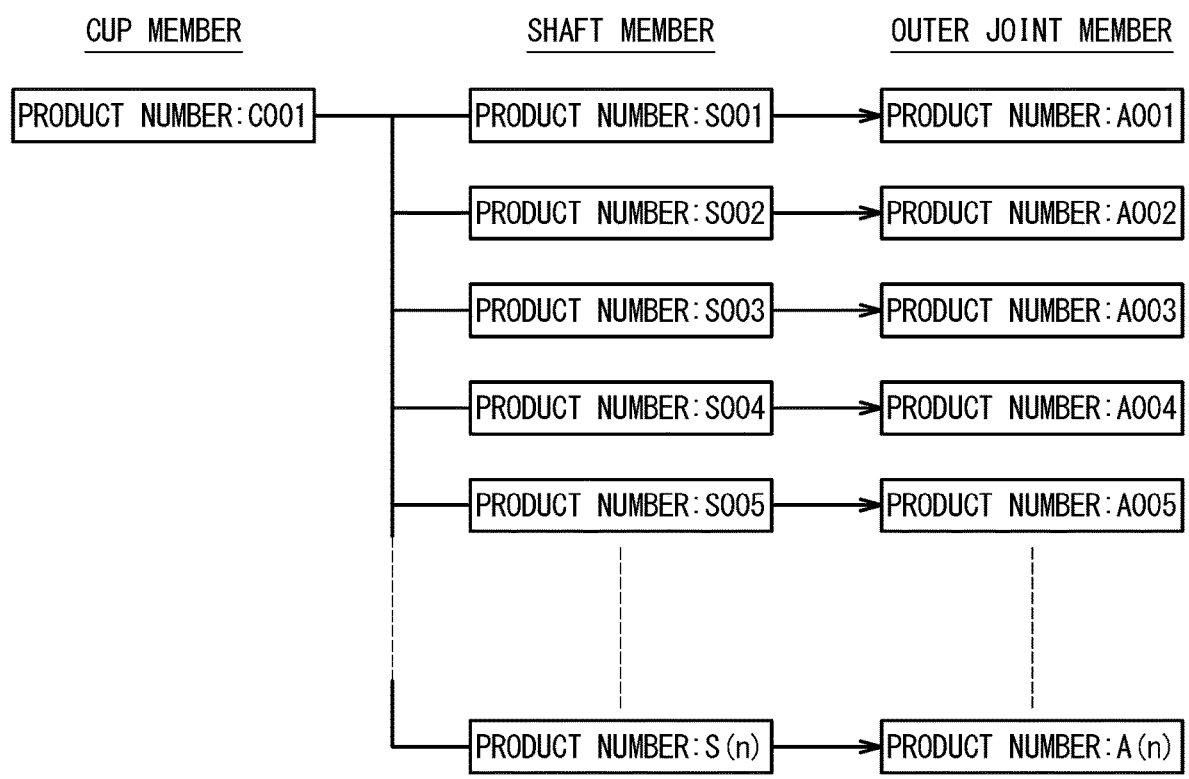
FIG. 21 is a block line diagram for illustrating an example of standardization of a product type of the cup member.

An example of standardization of a product type of the cup member is illustrated in FIG. 21.

As illustrated in FIG. 21, the cup member is prepared for common use for one joint size, and is assigned with, for example, a product number C001 for management. In contrast, the shaft member has a variety of specifications of the shaft section for each vehicle type, and is assigned with, for example, a product number S001, S002, or S(n) for management. For example, when the cup member assigned with the product number C001 and the shaft member assigned with the product number S001 are combined and welded to each other, the outer joint member assigned with a product number A001 can be produced.

Thus, owing to standardization of a product type of the cup member, it is possible to reduce cost and to alleviate a burden of production management. In the standardization of a product type, the cup member is not limited to one type for one joint size, that is, not limited to one type assigned with a single product number. For example, the cup member comprises cup members of a plurality of types (assigned with a plurality of product numbers, respectively) that are prepared for one joint size based on different specifications of a maximum operating angle, and are each prepared so that the outer diameter B of the joining end surface of each of those cup members has an equal dimension.

Next, a second embodiment of the outer joint member is described with reference to FIG. 22 and FIG. 23.

FIG. 22a is a partial sectional front view of the outer joint member. FIG. 22b is an enlarged view of a portion "b" of FIG. 22a. FIG. 22c is a view for illustrating a state before welding in FIG. 22b. FIG. 23 is a vertical sectional view for illustrating the cup member before welding.

The second embodiment is different from the above-mentioned first embodiment in the form of the protruding surface formed on the joining end surface of the cup member. Other configurations are the same as those in the first embodiment. Thus, parts that have the same function as those of the first embodiment are denoted by the same reference symbols except for the subscripts, and redundant description is omitted.

Figure 23:
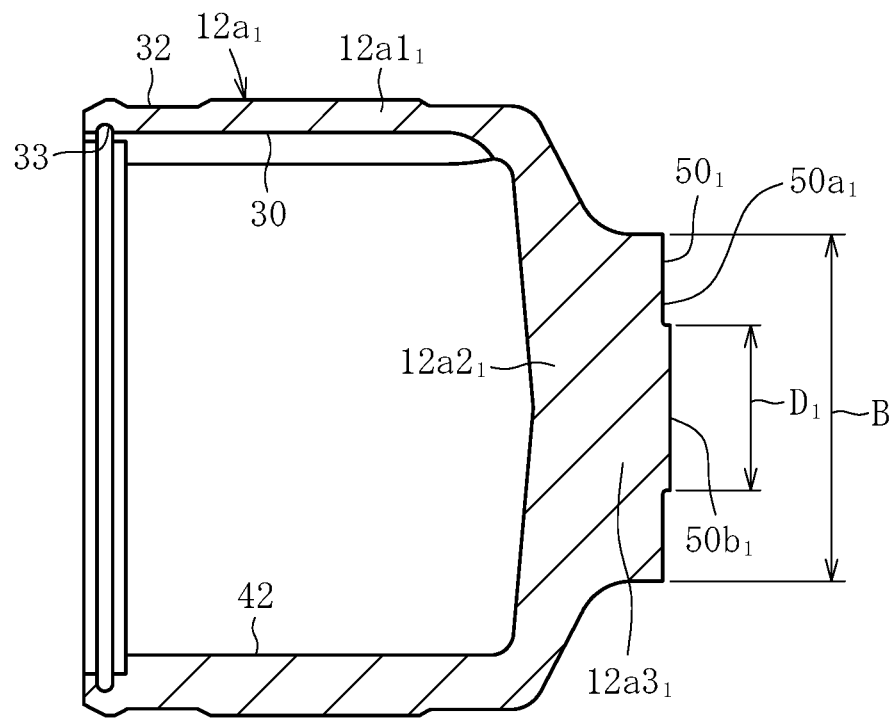

As illustrated in FIG. 22c and FIG. 23, a joining end surface $50_1$ formed on a short shaft section $12a3_1$ of a cup member $12a_1$ is annular, and a projecting portion $50b_1$ is formed on the radially inner side. In this case, a diameter $D_1$ of the annular joining end surface $50_1$ on the radially inner side corresponds to the inner diameter D of the joining end surface 50 of the cup member 12a of the first embodiment of the outer joint member. A portion of the joining end surface $50_1$ on the radially inner side protrudes toward the radially inner side with respect to the inner diameter E of the joining end surface 51 of the shaft member 13a. This protruding portion is referred to as a protruding surface $50a_1$ as in the first embodiment.

The cup member $12a_1$ can be formed by turning an end surface of the short shaft section $12a3'$ of the preform $12a'$ (FIG. 4a) for the cup member of the first embodiment after ironing at only a portion of the joining end surface $50_1$ on the radially outer side. Thus, the time for the turning can be reduced, with good material yield. As a matter of course, the projecting portion $50b_1$ on the radially inner side can also be subjected to turning. However, the number of steps can be reduced by maintaining the forged surface as it is.

Other configurations and operations, that is, the overview of the respective steps, the states of the cup member and the shaft member in the main processing steps, the preparation of the cup member for common use, the welding method, the ultrasonic flaw detection, the standardization of the product type, the configuration of the outer joint member, and the like as described above in relation to the first embodiment of the outer joint member are also applicable to the second embodiment of the outer joint member.

Figure 24:
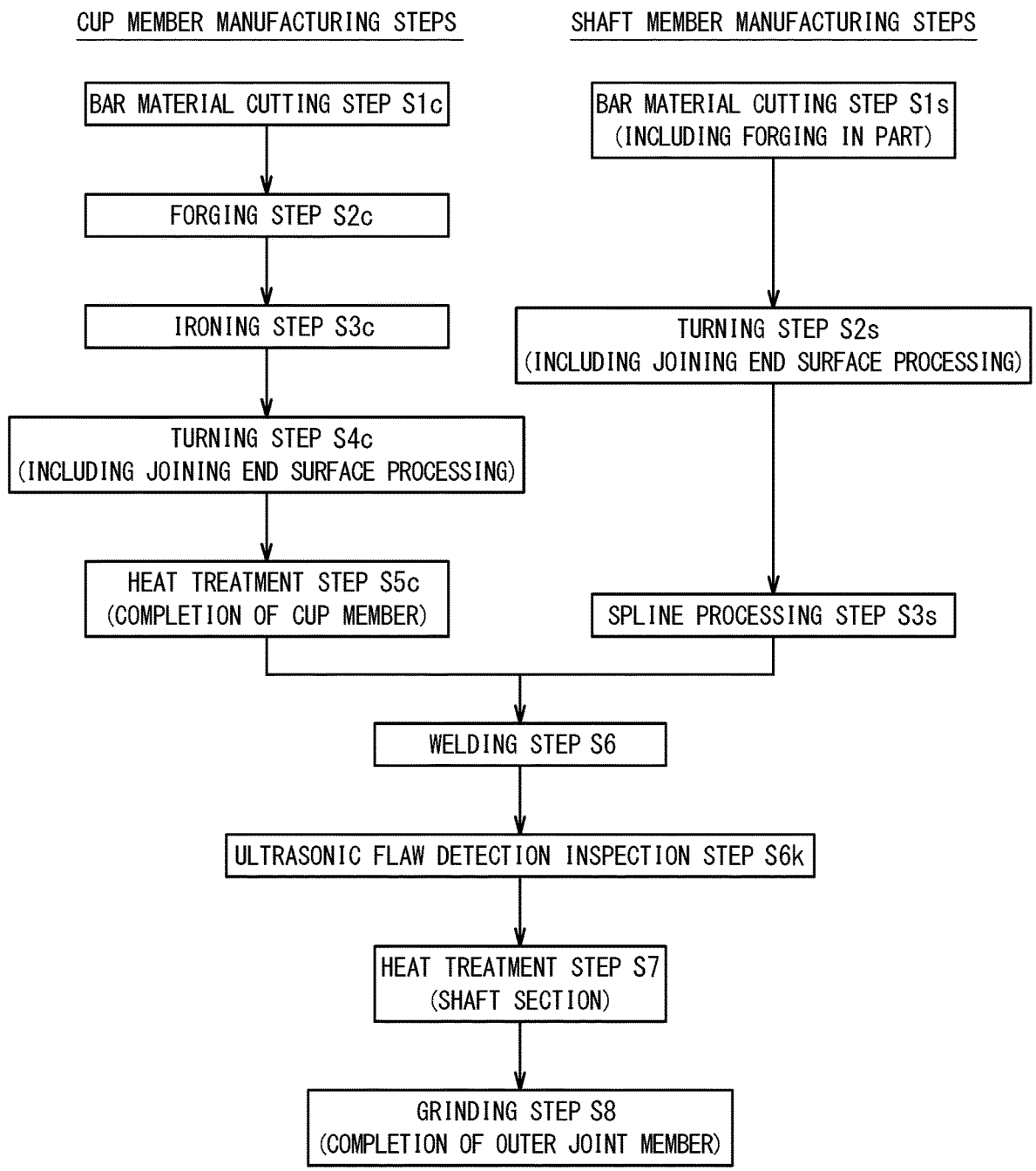
FIG. 24 is a block line diagram for illustrating a second embodiment of a method of manufacturing an outer joint member.

FIG. 24 is an illustration of a second embodiment of a manufacturing method of the outer joint member.

In the second embodiment, the heat treatment step for the cup member, which is involved in the heat treatment step S7 in FIG. 3, is provided before the welding step S6 and named "heat treatment step S5c", to thereby prepare the cup member as a finished product. Other than this point, the matters described above in relation to the first embodiment of the manufacturing method, that is, the overview of the respective steps, the states of the cup member and the shaft member in the main processing steps, the preparation of the cup member for common use, the welding method, the ultrasonic flaw detection, the standardization of the product type, the configuration of the outer joint member, and the like are also applicable to the second embodiment.

As illustrated in FIG. 4b, the cup member 12a has a shape extending from the joining end surface 50 to the large-diameter cylindrical portion 12a1 via the bottom portion 12a2, and the portions to be subjected to heat treatment that involves quenching and tempering are the track grooves 30 and the cylindrical inner peripheral surface 42 located at the inner periphery of the cylindrical portion 12a1. Therefore, the cup member 12a generally has no risk of thermal effect on the heat-treated portion during the welding. For this reason, the cup member 12a is subjected to heat treatment before the welding to be prepared as a finished product. Such manufacturing steps are suitable in practical use.

The cup member 12a is subjected to heat treatment for preparing the cup member 12a as a finished product, and is therefore assigned with a product number indicating a finished product for management. Thus, the standardization of the product type of the cup member 12a remarkably reduces the cost and alleviates the burden of production management. Further, the cup member 12a can be manufactured solely until the cup member 12a is completed as a finished product through the forging, turning, and heat treatment. Thus, the productivity is enhanced by virtue of reduction of setups and the like as well.

With regard to FIG. 21 for illustrating the example of standardization of the product type of the cup member described above in relation to the first embodiment of the manufacturing method, only the product number of the cup member in FIG. 21 is changed to the product number indicating a finished product, whereas the product numbers of the shaft member and the outer joint member are the same as those of the first embodiment of the manufacturing method. Therefore, description thereof is omitted herein.

Figure 25:
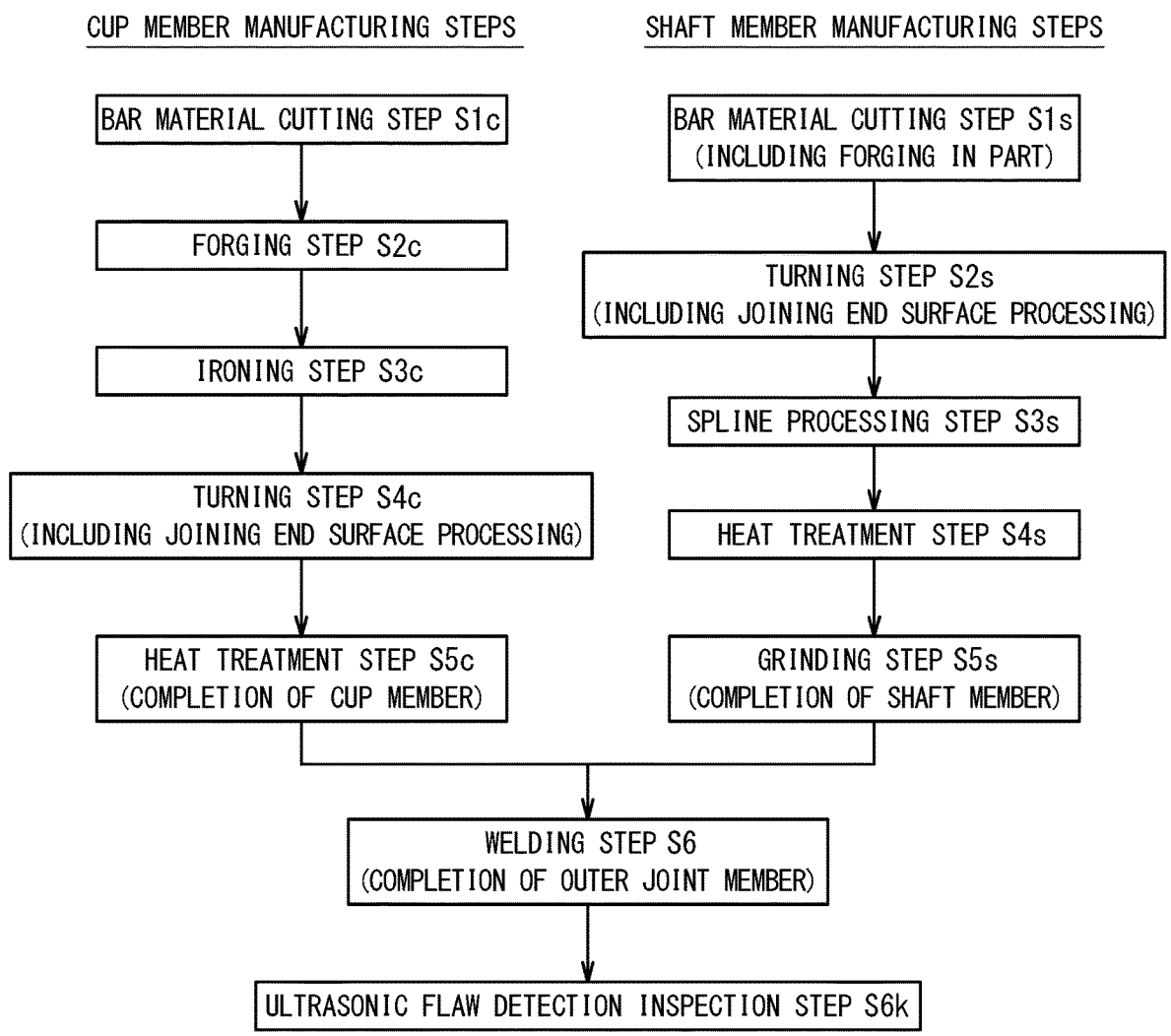
FIG. 25 is a block line diagram for illustrating a third embodiment of the method of manufacturing the outer joint member.

FIG. 25 is an illustration of a third embodiment of a manufacturing method of the outer joint member.

In the third embodiment, the heat treatment steps for the cup section and the shaft section, which are involved in the heat treatment step S7 in FIG. 3 described above in relation to the first embodiment, and the grinding step S8 for the shaft section in FIG. 3 are provided before the welding step S6 in the sequence and named "heat treatment step S5c for cup member", "heat treatment step S4s for shaft member", and "grinding step S5s". Thus, both the cup member and the shaft member are prepared as finished products. Other matters, that is, the overview of the respective steps, the states of the cup member and the shaft member in the main processing steps, the preparation of the cup member for common use, the welding method, the ultrasonic flaw detection, the standardization of the product type, the configuration of the outer joint member, and the like described in relation to the first embodiment are also applicable to the third embodiment.

After the spline processing step S3s, a hardened layer having a hardness of approximately from 50 HRC to 62 HRC is formed in a predetermined range of the outer peripheral surface of the shaft member by induction quenching in the heat treatment step S4s. Heat treatment is not performed on a predetermined portion in the axial direction, which includes the joining end surface 51. The heat treatment for the cup member, the assignment of the product number, and the like are the same as those of the second embodiment on the manufacturing method, and redundant description is therefore omitted herein.

After the heat treatment step S4s, the shaft member is transferred to the grinding step S5s so that the bearing mounting surface 14 and the like are finished. Thus, the shaft member is obtained as a finished product. Then, the shaft member is assigned with a product number indicating a finished product for management. The manufacturing steps of the third embodiment are suitable in a case of a cup member and a shaft member having shapes and specifications with no risk of thermal effect on the heat-treated portion during the welding.

In the manufacturing steps of the third embodiment, both the cup member and the shaft member can be assigned with product numbers indicating finished products for management. Thus, the standardization of the product type of the cup member further remarkably reduces the cost and alleviates the burden of production management. Further, the cup member and the shaft member can be manufactured independently of each other until the cup member and the shaft member are completed as finished products through the forging, turning, heat treatment, grinding after heat treatment, and the like. Thus, the productivity is further enhanced by virtue of reduction of setups and the like as well.

In the case of the third embodiment of the manufacturing method, with regard to FIG. 21 for illustrating the example of standardization of the product type of the cup member described above in relation to the first embodiment, the product numbers of the cup member and the shaft member in FIG. 21 are changed to the product numbers indicating finished products. The outer joint member is the same as that of the first embodiment of the manufacturing method. Therefore, description thereof is omitted herein. Note that, the cup member and the shaft member to be prepared as finished products are not limited to the cup member and the shaft member subjected to finishing such as the above-mentioned grinding after heat treatment or cutting after quenching, and encompass a cup member and a shaft member in a state in which the heat treatment is completed while the finishing is uncompleted.

As described with regard to the standardization of the product type, the cup member is not limited to one type for one joint size, that is, not limited to one type assigned with a single product number. The cup member encompasses, for example, cup members of a plurality of types (assigned with a plurality of product numbers, respectively) that are prepared for one joint size based on different specifications of a maximum operating angle, and are also prepared so that the outer diameters B of the above-mentioned joining end surfaces of the cup members are set to equal dimensions. In addition, the cup member encompasses, for example, cup members of a plurality of types (assigned with a plurality of product numbers, respectively) that are prepared for one joint size in order to achieve management of the cup members in a plurality of forms including intermediate components before heat treatment and finished components in consideration of the joint function, the circumstances at the manufacturing site, the productivity, and the like, and are also prepared so that the outer diameters B of the above-mentioned joining end surfaces of the cup members are set to equal dimensions.

Next, a third embodiment of the outer joint member is described with reference to FIG. 26 and FIG. 27.

Herein, parts that have the same function as those of the first embodiment of the outer joint member are denoted by the same reference symbols, and only main points are described.

Figure 26:
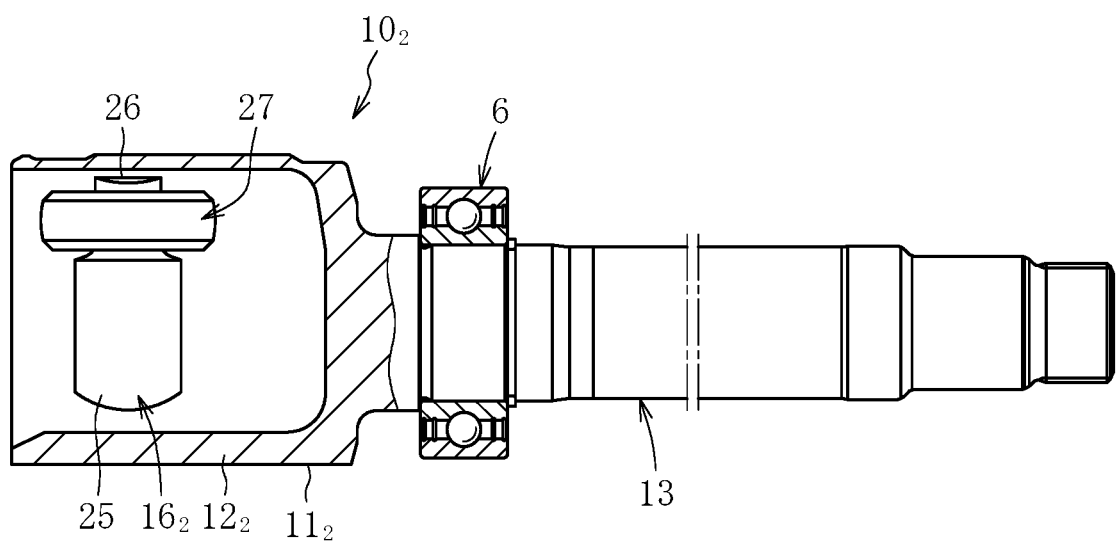
FIG. 26 is a partial sectional front view for illustrating a constant velocity universal joint of the third embodiment of the outer joint member.

A plunging type constant velocity universal joint $10_2$ illustrated in FIG. 26 is a tripod type constant velocity universal joint (TJ), and comprises an outer joint member $11_2$, an inner joint member $16_2$, and rollers 19 serving as torque transmitting elements. The outer joint member $11_2$ comprises a cup section $12_2$ and the long stem section 13 that extends from a bottom of the cup section $12_2$ in the axial direction. The inner joint member $16_2$ comprises a tripod member 25 comprising three equiangular leg shafts 26 configured to support the rollers 27 in a freely rotatable manner, and is housed along an inner periphery of the cup section $12_2$ of the outer joint member $11_2$. The rollers 27 are arranged between the outer joint member $11_2$ and the inner joint member $16_2$, and configured to transmit torque therebetween.

Similarly to the first embodiment of the outer joint member, the inner ring of the support bearing 6 is fixed to the outer peripheral surface of the long stem section 13, and the outer ring of the support bearing 6 is fixed to the transmission case with the bracket (not shown). The outer joint member $11_2$ is supported by the support bearing 6 in a freely rotatable manner, and thus the vibration of the outer joint member $11_2$ during driving or the like is prevented as much as possible.

Figure 27:
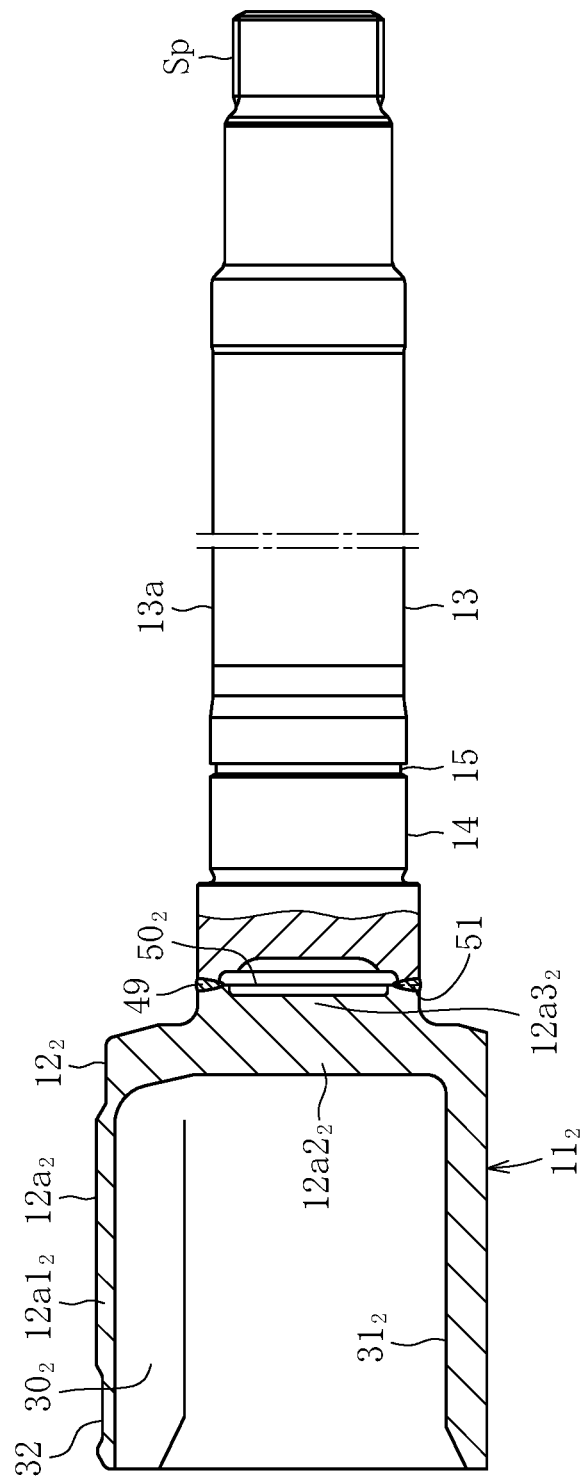
FIG. 27 is a partial sectional front view of the outer joint member of FIG. 26.
Figure 28:
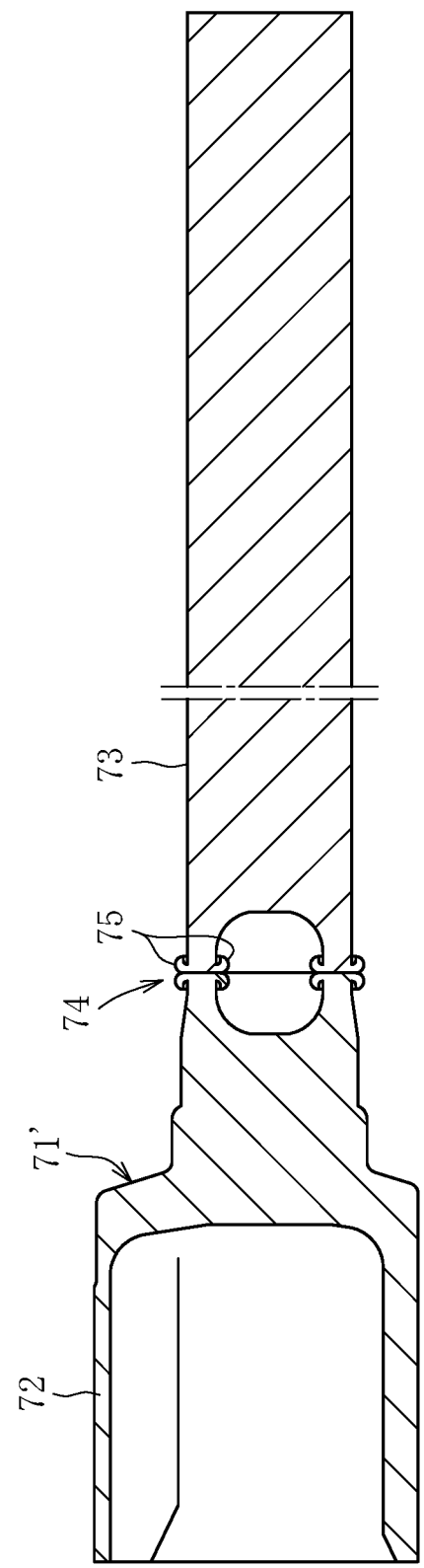
FIG. 28 is a vertical sectional view of an intermediate product of an outer joint member for illustrating the related art.
Figure 29:
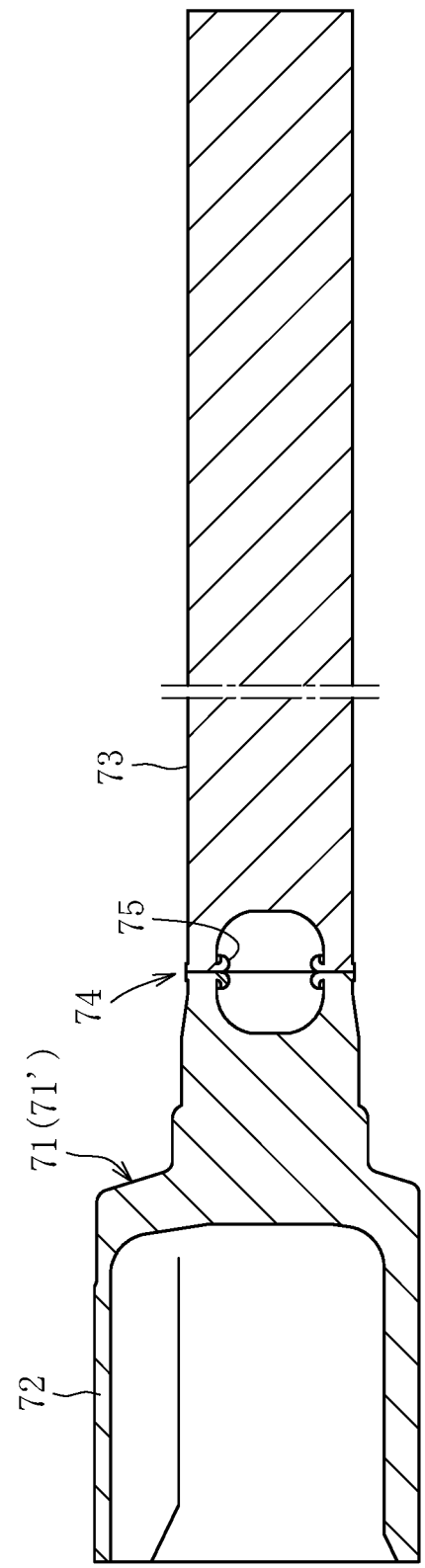
FIG. 29 is a vertical sectional view of the outer joint member for illustrating the related art.
Figure 30:
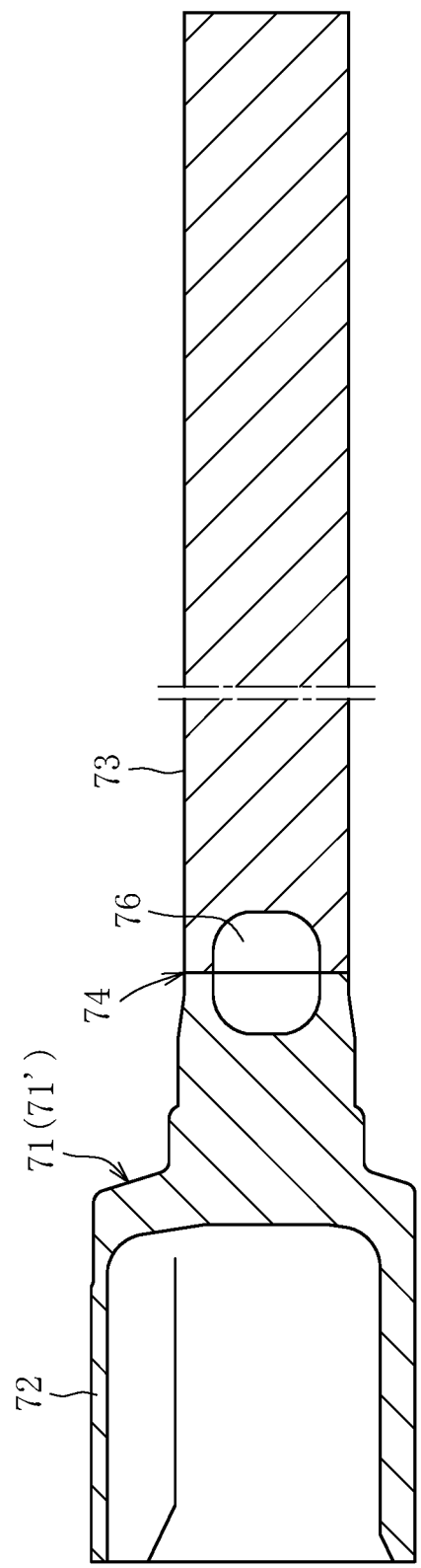
FIG. 30 is a vertical sectional view of an outer joint member for illustrating another related art.

As illustrated in FIG. 27, the outer joint member $11_2$ comprises a cup section $12_2$ and the long stem section 13. The cup section $12_2$ has a bottomed cylindrical shape that is opened at one end, and has track grooves $30_2$, on which the rollers 19 are caused to roll, formed at three equiangular positions on an inner peripheral surface $31_2$. The long stem section 13 extends from the bottom of the cup section $12_2$ in the axial direction and comprises the spline shaft Sp serving as the torque transmitting coupling portion formed at the outer periphery of the end portion on the side opposite to the cup section $12_2$.

The outer joint member $11_2$ is formed by welding the cup member $12a_2$ serving as the cup section $12_2$ and the shaft member 13a serving as the long stem section 13 to each other.

The cup member $12a_2$ is an integrally-formed product having a cylindrical portion $12a1_2$ and a bottom portion $12a2_2$, and has track grooves 130 and an inner peripheral surface 131 formed at the inner periphery of the cylindrical portion $12a1_2$. A short shaft section $12a3_2$ is formed at the bottom portion $12a2_2$. A boot mounting groove 32 is formed at an outer periphery of the cup member $12a_2$ on the opening side.

In the shaft member 13a, the bearing mounting surface 14 and the snap ring groove 15 are formed at the outer periphery on the cup member $12a_2$ side, and the spline shaft Sp is formed at an end portion on the side opposite to the cup member $12a_2$.

A joining end surface $50_2$ formed at the short shaft section $12a3_2$ of the cup member $12a_2$ and the joining end surface 51 formed at the end portion of the shaft member 13a on the cup member $12a_2$ side are brought into abutment against each other, and are welded to each other by radiating an electron beam from the radially outer side. As is well known, the welded portion 49 comprises metal that is molten and solidified during welding, that is, the molten metal, and the heat-affected portion in the periphery thereof.

Similarly to the first embodiment of the outer joint member, the outer diameters B of the joining end surface $50_2$ and the joining end surface 51 are set to equal dimensions for each joint size. The welded portion 49 is formed on the cup member $12a_2$ side with respect to the bearing mounting surface 14 of the shaft member 13a, and hence the bearing mounting surface 14 and the like can be processed in advance so that post-processing after welding can be omitted. Further, due to the electron beam welding, burrs are not generated at the welded portion. Thus, post-processing for the welded portion can also be omitted, which can reduce the manufacturing cost.

The matters described in relation to the first and second embodiments of the outer joint member and the first to third embodiments of the manufacturing method are also applicable to the third embodiment of the outer joint member.

Herein, with regard to setting of the outer diameters B of the joining end surface 50, $50_2$, or $50_2$ of the cup member $12a$, $12a_1$, or $12a_2$ and the protruding surfaces $50a$ and $50a_1$ to the equal dimension for each joint size, the cup member $12a$, $12a_1$, or $12a_2$ is not limited to one type for one joint size, that is, not limited to one type assigned with a single product number.

For example, the cup member encompasses cup members of a plurality of types (assigned with a plurality of product numbers, respectively) that are prepared for one joint size based on different specifications of a maximum operating angle, and are also prepared so that the outer diameters of the above-mentioned joining end surfaces of the cup members are set to equal dimensions and that the protruding surfaces are formed into the same shape.

In addition, the cup member encompasses, for example, cup members of a plurality of types (assigned with a plurality of product numbers, respectively) that are prepared for one joint size in order to achieve management of the cup members in a plurality of forms including intermediate components before heat treatment and finished components after heat treatment in consideration of the joint function, the circumstances at the manufacturing site, the productivity, and the like, and are also prepared so that the outer diameters of the above-mentioned joining end surfaces of the cup members are set to equal dimensions and that the protruding surfaces are formed into the same shape.

Further, setting the outer diameter B of the joining end surface 50, 50$_1$, or 50$_2$ of the cup member 12$a$, 12$a_1$, or 12$a_2$ to an equal dimension for each joint size, or forming the protruding surfaces 50$a$ and 50$a_1$ into the same shape for each joint size may be applied also to different types of constant velocity universal joints.

For example, setting outer diameters of the joining end surfaces of a tripod type constant velocity universal joint and a double-offset constant velocity universal joint to equal dimensions, and forming the protruding surface into the same shape on the inboard side are also encompassed. Further, setting outer diameters of the joining end surfaces of a Rzeppa type constant velocity universal joint and an undercut-free constant velocity universal joint to equal dimensions, and forming the protruding surface into the same shape on the outboard side are also encompassed. Further, setting the outer diameters of the joining end surfaces of the constant velocity universal joints on the inboard side and the outboard side to equal dimensions, and forming the protruding surface into the same shape on the inboard side and the outboard side are also possible.

At least one of the cup member 12$a$, 12$a_1$, or 12$a_2$ and the shaft member 13$a$ or 13$b$ before the welding may be prepared as an intermediate component without performing heat treatment. In this case, the heat treatment and finishing such as grinding and quenched-steel cutting work are performed after welding. Thus, this configuration is suited to the cup members 12$a$, 12$a_1$, and 12$a_2$ and the shaft members 13$a$ and 13$b$ having such shapes and specifications that the hardness of the heat-treated portion may be affected by temperature rise at the periphery due to heat generated during welding after heat treatment. The intermediate component is assigned with a product number for management.

Further, at least one of the cup member 12$a$, 12$a_1$, or 12$a_2$ and the shaft member 13$a$ or 13$b$ before the welding may be prepared as a finished component subjected to heat treatment. The finished component subjected to heat treatment is a finished component subjected to the heat treatment and the finishing such as grinding after the heat treatment or quenched-steel cutting work. In this case, it is possible to obtain the cup member 12$a$, 12$a_1$, or 12$a_2$ prepared as the finished component for common use for each joint size, and the shaft members having a variety of specifications of the shaft section for each vehicle type. Thus, the cup members and the shaft members can each be assigned with a product number for management. Therefore, the cost is significantly reduced through the standardization of a product type of the cup members 12$a$, 12$a_1$, and 12$a_2$, and the burden of production management is significantly alleviated.

Further, the cup members 12$a$, 12$a_1$, and 12$a_2$ prepared for common use and the shaft members 13$a$ and 13$b$ having a variety of specifications of the shaft section can be manufactured separately until the cup members and the shaft members are formed into the finished components subjected to the finishing such as forging, turning, heat treatment, grinding, and quenched-steel cutting work. Further, as well as reduction of setups and the like, the enhancement of productivity is achieved. However, the cup members 12$a$, 12$a_1$, and 12$a_2$ and the shaft members 13$a$ and 13$b$ as the finished components are not limited to members subjected to finishing such as the grinding after the heat treatment or the quenched-steel cutting work as described above. The cup members 12$a$, 12$a_1$, and 12$a_2$ and the shaft members 13$a$ and 13$b$ assuming a state after completion of heat treatment and before being subjected to the finishing are encompassed.

The effects of the above-mentioned embodiments of the present invention are summarized and described below.

The inspection device 80 according to the embodiment is a device configured to inspect the outer joint member 11, 11$_1$, or 11$_2$ of a constant velocity universal joint. The outer joint member 11, 11$_1$, or 11$_2$ comprises the cup section 12 having a bottomed cylindrical shape and having track grooves in an inner periphery thereof to allow torque transmitting elements to roll therein, and the shaft section 13 extending from a bottom of the cup section 12 in an axial direction. The outer joint member 11, 11$_1$, or 11$_2$ is obtained through melt-welding on the cup member 12$a$, 12$a_1$, or 12$a_2$ forming the cup section 12 and the shaft member 13$a$, 13$a_1$, or 13$a_2$ forming the shaft section 13. The inspection device 80 comprises the surface inspection unit III configured to perform inspection for detecting a defect which appears on a surface of the outer joint member 11, 11$_1$, or 11$_2$ due to welding, the internal inspection unit IV configured to perform inspection of an internal defect of the welded portion 49, and the recording unit configured to record inspection results of the inspection. Through use of the inspection device 80, in-line total inspection for the joint-type outer joint member 11, 11$_1$, or 11$_2$ obtained through melt-welding can be performed efficiently. Thus, quality of the joint-type outer joint member 11, 11$_1$, or 11$_2$ can be guaranteed, and quality management securing traceability can be performed.

As the welding or melt-welding, for example, high energy intensity beam welding can be employed. A representative example of the high energy intensity beam welding is electron beam welding or laser welding. With the welding through use of the high energy intensity beam, a bead width is small, and deep penetration can be obtained in a short period of time. Thus, strength of the welded portion is increased, and thermal distortion is small. Further, burrs are not formed. Thus, post-processing for the joining portion can be omitted. As a result, manufacturing cost can be reduced, and there is no scattering of ultrasonic waves caused by burrs, which is problematic in a case where joining is performed through friction press-contact. Thus, through total inspection with the ultrasonic flaw detection, high welding quality can be secured in a stable manner. Further, in general, the electron beam welding is performed in vacuum. Thus, even when a hollow cavity portion is present in the welded portion, problems such as blowing of a molten material and generation of bubbles are less liable to occur.

The surface inspection unit III is configured to measure deflection of the workpiece W (outer joint member 11, 11$_1$, or 11$_2$) through use of the contact-type gauge 86$a$. With this, a defective workpiece having deflection exceeding a preset upper limit can reliably be removed from the line.

The surface inspection unit III comprises the laser displacement meter 86b. A defect which appears on a surface of the welded portion 49 is detected through use of the laser displacement meter 86b. A representative example of such defect is a pit. A workpiece W which has a depth of the pit exceeding a preset upper limit is determined as being defective and reliably removed from the line.

The internal inspection unit IV is configured to detect at least one of internal defects such as poor penetration, a blowhole, and a weld crack through the ultrasonic flaw detection. The poor penetration indicates the presence of an unwelded surface. In that case, stress concentration occurs at an end of the welded portion 49, which may be problematic in view of strength. However, through detection of the poor penetration, the blowhole, and the weld crack with the internal inspection unit IV, such defective workpiece W can reliably be removed.

The recording unit is arranged in the inspection device 80, and the detection result of each of the above-mentioned inspection is recorded in association with a product number of each workpiece W. Thus, traceability can be secured.

The embodiments of the present invention are described above with reference to the attached drawing. However, the present invention is not limited to the embodiments described herein and illustrated in the attached drawings. The present invention can be carried out with various modifications within the range of not departing from the scope of claims.

The case of employing the electron beam welding is described as an example. However, the present invention is applicable not only to the case of the electron beam welding but also to the case of employing laser welding or other welding or melt-welding through use of a high energy intensity beam.

Further, the double-offset type constant velocity universal joint and the tripod type constant velocity universal joint are exemplified as the plunging type constant velocity universal joint. However, the present invention is also applicable to an outer joint member of a cross-groove type constant velocity universal joint or other plunging type constant velocity universal joint, and to an outer joint member of a fixed type constant velocity universal joint. Further, the case of applying the present invention to the outer joint member of the constant velocity universal joint constructing a drive shaft is described as an example. However, the present invention is also applicable to an outer joint member of a constant velocity universal joint constructing a propeller shaft.

REFERENCE SIGNS LIST

10, $10_2$ plunging type constant velocity universal joint
11, $11_1$, $11_2$ outer joint member
12, $12_1$, $12_2$ cup section
12a, $12a_1$, $12a_2$ cup member
12a1, $12a1_1$, $12a1_2$ cylindrical portion
12a2, $12a2_1$, $12a2_2$ bottom portion
12a3, $12a3_1$, $12a3_2$ short shaft section shaft section (long stem section)
13a, 13b shaft member
16 inner joint member
41 torque transmitting element (ball)
49 welded portion
49a back bead
80 inspection device
82 cooling water bath
84 draining device
86 dial gauge (contact-type displacement meter)
88 laser displacement meter
90 robot hand
100 welding apparatus
120 ultrasonic flaw detection device
I cooling unit
II draining unit
III surface inspection unit
IV internal inspection unit

The invention claimed is:

1. An inspection device for a joint-type outer joint member of a constant velocity universal joint that includes a cup section having a bottomed cylindrical shape and having track grooves in an inner periphery thereof to allow torque transmitting elements to roll therein, and a shaft section extending from a bottom of the cup section, the joint-type outer joint member being obtained through welding of a cup member forming the cup section and a shaft member forming the shaft section, the inspection device comprising:
a cooling unit configured to cool the joint-type outer joint member with cooling water after welding;
a draining unit;
a surface inspection unit configured to perform an inspection for detecting a defect which appears on a surface of the joint-type outer joint member due to the welding;
an internal inspection unit configured to perform an inspection for an internal defect of a welded portion;
a first robot hand configured to deliver the joint-type outer joint member after the welding from the cooling unit to the draining unit;
a second robot hand configured to deliver the joint-type outer joint member from the draining unit to the surface inspection unit;
a third robot hand configured to deliver the joint-type outer joint member from the surface inspection unit to the internal inspection unit; and
a recording unit configured to record an inspection result of the inspections, wherein
the surface inspection unit includes a contact gauge configured to measure a deflection of the shaft section of the joint-type outer joint member, and a laser displacement meter configured to detect a pit over an entire circumference of a bead surface of the welded portion, and
the internal inspection unit is configured to perform the inspection for the internal defect through ultrasonic flaw detection.

2. The inspection device for a joint-type outer joint member of a constant velocity universal joint according to claim 1, wherein the internal inspection unit is configured to detect at least one of poor penetration, a blowhole, and a weld crack through the ultrasonic flaw detection.

3. The inspection device for a joint-type outer joint member of a constant velocity universal joint according to claim 2, wherein the recording unit is configured to record the inspection result of the inspections in association with a product number of each workpiece.

4. The inspection device for a joint-type outer joint member of a constant velocity universal joint according to claim 1, wherein the recording unit is configured to record the inspection result of the inspections in association with a product number of each workpiece.

* * * * *